United States Patent
Budnik et al.

(10) Patent No.: US 11,502,766 B2
(45) Date of Patent: Nov. 15, 2022

(54) PRECISION TIME PROTOCOL WITH MULTI-CHASSIS LINK AGGREGATION GROUPS

(71) Applicant: Arista Networks, Inc., Santa Clara, CA (US)

(72) Inventors: Petr Budnik, Vancouver (CA); Jeff Jing Yuen Chan, Burnaby (CA); Avininderpal Singh Grewal, Langley (CA)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 16/853,530

(22) Filed: Apr. 20, 2020

(65) Prior Publication Data
US 2021/0328697 A1  Oct. 21, 2021

(51) Int. Cl.
*H04J 3/06* (2006.01)
*H04L 45/24* (2022.01)
*H04L 67/1095* (2022.01)

(52) U.S. Cl.
CPC .......... *H04J 3/0667* (2013.01); *H04J 3/0697* (2013.01); *H04L 45/245* (2013.01); *H04L 67/1095* (2013.01)

(58) Field of Classification Search
CPC ..... H04J 3/0667; H04J 3/0697; H04L 45/245; H04L 67/1095
See application file for complete search history.

(56) References Cited

U.S. PATENT DOCUMENTS

| | | | | |
|---|---|---|---|---|
| 8,879,552 B2* | 11/2014 | Zheng | ................... | H04J 3/0667 370/252 |
| 8,976,778 B2* | 3/2015 | Bedrosian | ............. | H04J 3/0667 370/348 |
| 9,929,928 B1* | 3/2018 | Dekoos | ............... | H04L 43/0852 |
| 10,158,444 B1* | 12/2018 | Darras | ................. | H04J 3/0667 |
| 10,284,318 B1* | 5/2019 | Choudhury | ........... | H04L 47/828 |
| 2009/0207863 A1* | 8/2009 | Cheng | ................... | H04J 3/0641 370/498 |
| 2013/0003757 A1* | 1/2013 | Boatright | ........... | H04N 21/4381 370/474 |
| 2013/0034197 A1* | 2/2013 | Aweya | .................. | H03L 7/0991 375/362 |
| 2013/0227008 A1* | 8/2013 | Yang | ..................... | H04J 3/0667 709/204 |
| 2013/0336117 A1* | 12/2013 | Yan | ........................ | H04J 3/0667 370/235 |
| 2014/0133480 A1* | 5/2014 | Ehlers | .................... | H04J 3/0673 370/350 |

(Continued)

*Primary Examiner* — Melanie Jagannathan
(74) *Attorney, Agent, or Firm* — Fountainhead Law Group PC

(57) ABSTRACT

The precision time protocol (PTP) runs on the peer switches in an MLAG domain. PTP messages received by one peer switch on an MLAG interface is selectively peer-forwarded to the other peer switch on the same MLAG interface in order to coordinate a synchronization session with a PTP node. The peer-forwarded messages inform one peer switch to be an active peer and the other peer switch to be an inactive peer so that timestamped messages during the synchronization session are exchanged only between the PTP node and the active peer, and hence take the same data path.

20 Claims, 12 Drawing Sheets

(56) References Cited

U.S. PATENT DOCUMENTS

| | | | |
|---|---|---|---|
| 2014/0348182 A1* | 11/2014 | Chandra | H04J 3/0667 |
| | | | 370/503 |
| 2015/0113174 A1* | 4/2015 | Yang | H04L 69/28 |
| | | | 709/248 |
| 2016/0156427 A1* | 6/2016 | Yang | H04J 3/0685 |
| | | | 370/503 |
| 2016/0170439 A1* | 6/2016 | Aweya | H04L 69/28 |
| | | | 713/401 |
| 2016/0197719 A1* | 7/2016 | Wang | H04L 7/04 |
| | | | 709/248 |
| 2016/0277138 A1* | 9/2016 | Garg | H04L 45/20 |
| 2017/0288801 A1* | 10/2017 | Aweya | H04W 56/001 |
| 2018/0192385 A1* | 7/2018 | Boehlke | H04W 56/001 |
| 2018/0287725 A1* | 10/2018 | Rabinovich | H04J 3/0667 |
| 2018/0351676 A1* | 12/2018 | Butterworth | H04J 3/0667 |
| 2019/0089615 A1* | 3/2019 | Branscomb | H04L 43/028 |
| 2019/0097745 A1* | 3/2019 | Mallela | H04J 3/0667 |
| 2019/0319729 A1* | 10/2019 | Leong | H04J 3/0667 |

* cited by examiner

PRECISION TIME PROTOCOL WITH MULTI-CHASSIS LINK AGGREGATION GROUPS

BACKGROUND

The Precision Time Protocol (PTP) is a protocol defined by the IEEE 1588-2008 specification. PTP is used to exchange timing information among nodes (network devices such as switches, routers, host computers, machinery, etc.) in the network to achieve microsecond to nanosecond accuracy across the network. Nodes that participate in PTP are referred to as "clocks" and can have one or more ports that run PTP. Each PTP port can serve as a master port or a slave port. PTP defines several kinds of messages, including messages that perform synchronization between a master clock and a slave clock. Some of the synchronization messages are timestamped in terms of when they were transmitted by one clock and when they were received across the link by the other clocks. The timestamp information is used to synchronize the slave clock to the master clock.

BRIEF DESCRIPTION OF THE DRAWINGS

With respect to the discussion to follow and in particular to the drawings, it is stressed that the particulars shown represent examples for purposes of illustrative discussion and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

In the following description, for purposes of explanation, numerous examples and specific details are set forth in order to provide a thorough understanding of the present disclosure. It will be evident, however, to one skilled in the art that the present disclosure as expressed in the claims may include some or all of the features in these examples, alone or in combination with other features described below, and may further include modifications and equivalents of the features and concepts described herein.

Figure 1:
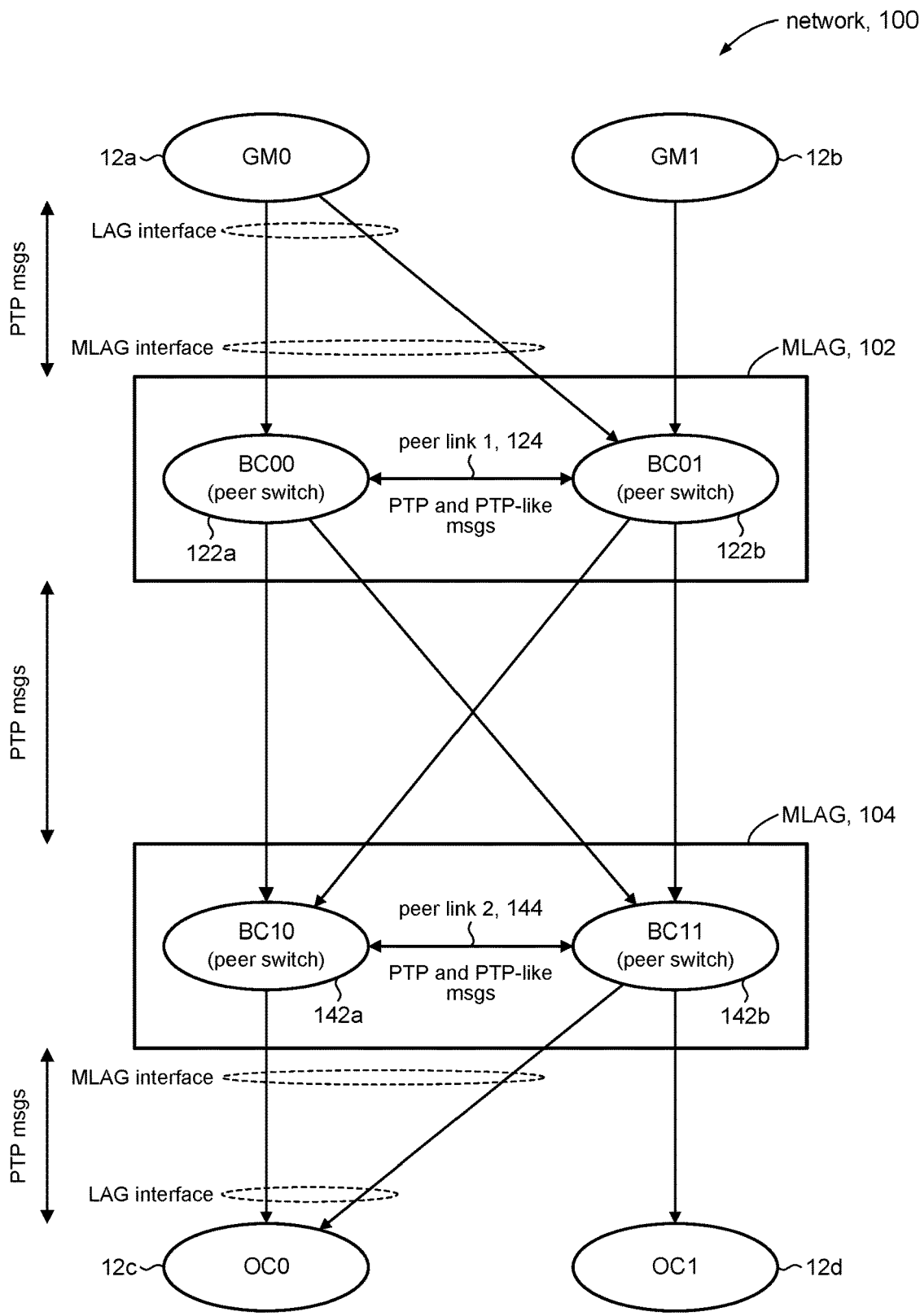
FIG. 1 illustrates a system block diagram in accordance with some embodiments.

FIG. 1 shows an illustrative network configured with multi-chassis link aggregation group (MLAG) devices. In some embodiments, for example, network 100 can include MLAG domains 102, 104. Each MLAG domain (or simply MLAG) can connect to respective host machines 12a-12d, collectively referenced as host machines 12. The illustrative embodiment in FIG. 1 shows host machine 12a connected to MLAG 102, and more particularly to peer switches 122a, 122b. Host machine 12b is connected to MLAG 102 at peer switch 122b. Host machines 12c and 12d are similarly connected to peer switches 142a, 142b in MLAG 104. It will be appreciated that host machines 12 can be any kind of computing device, including user computers and networking devices such as switches, routers, peer switches in other MLAG devices, and so on.

The configuration in FIG. 1 represents a general topology that includes MLAGs for the purposes of describing operation of the Precision Time Protocol (PTP) in an MLAG device in accordance with the present disclosure. PTP is a protocol defined by the IEEE 1588-2008 specification and is incorporated herein by reference in its entirety for all purposes. PTP can be referred to herein variously as PTP, PTP specification, PTP standard, PTP protocols, and so on. PTP is designed to synchronize the clocks in the devices (host machines, switches, routers, etc.) in a network, such as network 100. From the point of view of PTP, the devices themselves can be referred to as "clocks" or PTP nodes.

PTP nodes in a network are organized into a master/slave synchronization hierarchy (timing tree) with a grandmaster clock at the top of the hierarchy that determines the reference time in a given network. The PTP specification defines various types of messages that are exchanged between PTP nodes. For example, Announce messages are used to establish the synchronization hierarchy among PTP nodes in the network, which includes establishing the master/slave hierarchy in accordance with the best master clock algorithm (BMCA) in IEEE 1588-2008 and selecting a grandmaster. Synchronization messages (e.g., Sync, FollowUp, Delay-Req, and DelayResp) are exchanged between two PTP nodes (master clock and slave clock) to synchronize the slave clock to the master clock. Messages defined by the PTP standard are referred to herein as PTP-standard messages (or simply PTP messages) to distinguish PTP-like messages which are defined in accordance with the present disclosure. The PTP Announce, FollowUp, and DelayResp messages fall under the category of general messages per the PTP standard. The PTP Sync and DelayReq messages are referred to as event messages per PTP standard.

Continuing with FIG. 1, the various PTP nodes shown in the figure (e.g., host machines 12, peer switches in MLAGs 102, 104) each have clocks that can be synchronized in accordance with the PTP protocol. In the configuration shown, for example, host machines 12a and 12b are depicted as grandmaster clocks, GM0, GM1. The peer switches 122a, 122b, 124a, 124b in MLAGs 102, 104 are boundary clocks, BC00, BC01, BC10, BC11. Host machines 12c, 12d are ordinary clocks, OC0, OC1. Grandmaster clocks, boundary clocks, and ordinary clocks are defined by PTP. As understood by persons of skill, the clock hierarchy and designation of host machines 12a, 12b as grandmaster clocks will have been determined by exchanging Announce messages and applying the best master clock algorithm (BMCA) defined in IEEE 1588-2008, the details of which are beyond the scope of the present disclosure.

FIG. 1 illustrates the exchange of PTP messages (e.g., Announce, Sync, FollowUp, DelayReq, and DelayResp) between the devices in network 100, which are processed by the devices to establish a master/slave clock hierarchy and to provide clock synchronization. In accordance with the present disclosure, the peer switches that comprise MLAGs 102, 104 can exchange "PTP-like" messages in order to coordinate the process within each MLAG. As will be discussed in more detail, PTP-like messages, which are not defined in the PTP specification, are exchanged in conjunction with the exchange of PTP messages. For example, peer switches 122a, 122b of MLAG 102 exchange PTP-like messages with each other over peer link 124, and likewise peer switches 142a, 142b of MLAG 104 exchange PTP-like messages with each other over peer link 144, in addition to the regular PTP messages as per the PTP protocol.

Figure 2:
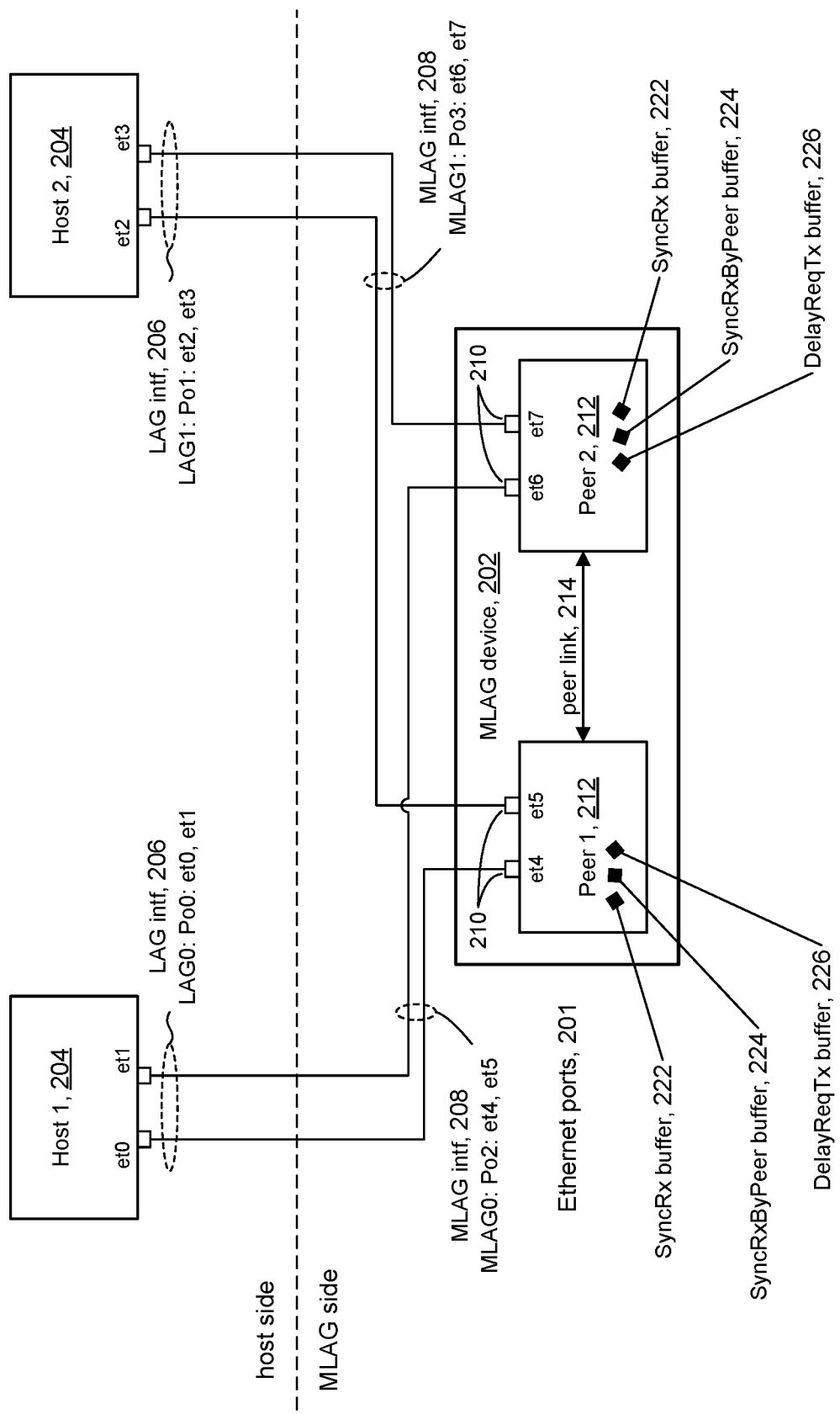
FIG. 2 shows details of a multi-chassis link aggregation group (MLAG) domain in accordance with some embodiments.

Referring to FIG. 2, although MLAG devices are known, a brief description is nonetheless provided to point out aspects of MLAG devices and MLAG operation to facilitate a description of embodiments in accordance with the present disclosure. FIG. 2 shows an MLAG device in accordance with some embodiments. The figure shows host machines 204 connected to MLAG device 202. MLAG device 202 includes peer switches 212, Peer 1, Peer 2. Each peer switch 212 includes physical ports (e.g., Ethernet ports 210). Peer switch 1, for example, includes Ethernet ports et4, et5, and likewise, peer switch 2 includes Ethernet ports et6, et7. Peer switches 212 communicate with each other over peer link 214. Peer link 214 can exchange control information and data traffic between peer switches 212.

On the host side, host machines 204 treat the connections to MLAG 202 as respective LAG interfaces 206; e.g., LAG0 for Host 1 and LAG1 for Host 2. Members of LAG0 are Ethernet ports et0 and et1 on Host 1. Likewise, members of LAG1 are Ethernet ports et2 and et3 on Host 2. When sending packets on a LAG interface, the host will select one of the members on which to transmit the packet. For example, the host can use a hash function to assign packets to a LAG member in a pseudo-random fashion in order to load-balance packets across members of the LAG interface. For example, a hash function can be applied to the upper layer protocol header information to generate a hash value that is used to select the LAG member. As such, the host generally does not control which LAG member will be chosen for a given packet.

On the MLAG side, MLAG device 202 treats the connections to hosts 204 as respective MLAG interfaces 208, MLAG0 and MLAG1. Members of MLAG0 are Ethernet port et4 on Peer 1 and Ethernet port et6 on Peer 2. Likewise, members of MLAG1 are Ethernet port et5 on Peer 1 and Ethernet port et7 on Peer 2. Peer link 214 is used to pass packets between Peer 1 and Peer 2.

In accordance with the present disclosure, the peer switches in an MLAG (e.g., Peers 1 and 2 in MLAG 202) operate as separate physical devices (PTP nodes) from the perspective of PTP. Each peer switch has its own oscillator and its own clock identity which it can use exclusively in all PTP messages it sends. Each peer switch can run the standard PTP implementation independently of the other peer switch. As such, each peer switch maintains its own master/slave relation with PTP nodes connected to the peer (e.g., by the exchange Announce messages) independently of the other peer. Likewise, each peer switch executes clock synchronization independently of the other peer (e.g., by the exchange of Sync, FollowUp, DelayReq, and DelayResp messages).

In accordance with some embodiments, each peer switch 212 can include a SyncRx buffer 222, a SyncRxByPeer buffer 224, and a DelayReqTx buffer 226 to store messages associated with ongoing clock synchronization sequences. These buffers are discussed in more detail below, but briefly as the names suggest, the SyncRx buffer is for PTP Sync messages received by the given peer switch itself, the DelayReqTx buffer is for PTP DelayReq messages sent by the given peer switch, and the SyncRxByPeer buffer relates to PTP Sync messages received by the peer of the given peer switch.

In accordance with some embodiments, an MLAG interface (e.g., MLAG0) can be referred to being "enabled" or "disabled." An MLAG interface that is enabled means that its member ports (e.g., et4, et6 for MLAG0) will process PTP messages in accordance with the present disclosure. Conversely, an MLAG interface that is disabled means its member ports (e.g., et4, et6 for MLAG0) will process PTP messages in accordance with the PTP specification.

Clock Synchronization

Figure 3:
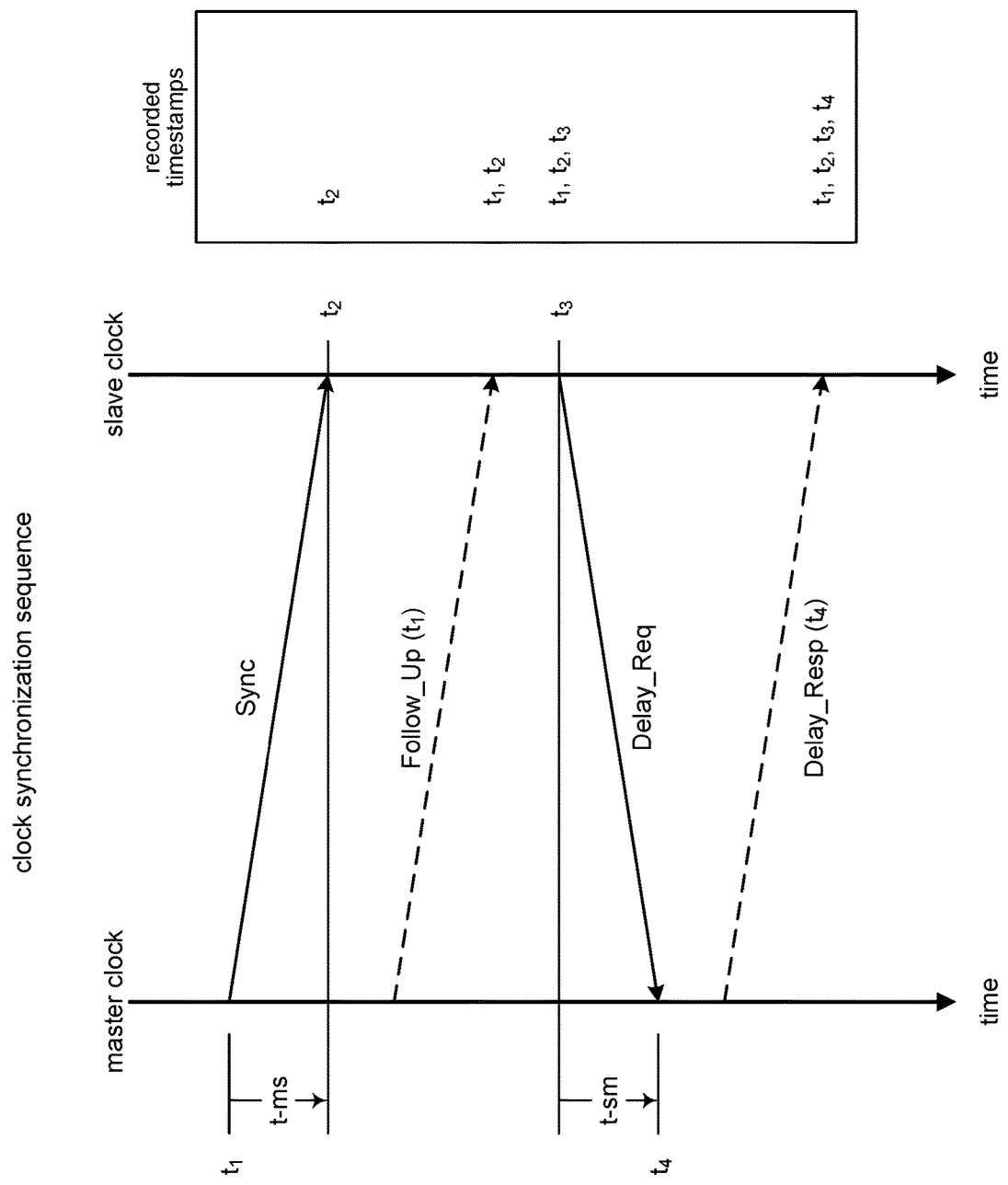
FIG. 3 shows the synchronization sequence in accordance with the PTP specification.

FIG. 3 shows the sequence of PTP Sync, FollowUp, DelayReq, and DelayResp messages for synchronizing a slave clock to a master clock per the PTP specification. The sequence begins with the master clock sending a Sync message to the slave clock. The various timestamps include:
- $t_1$—timestamp of when Sync message leaves the master clock
- $t_2$—timestamp of when Sync arrives to the slave clock
- $t_3$—timestamp of when DelayReq leaves the slave clock
- $t_4$—timestamp of when DelayReq arrives to the master clock The FollowUp and DelayResp messages are used to convey the $t_1$ and $t_4$ timestamps, respectively, from the master clock to the slave clock in order for the latter to have all four timestamps. These timestamps are used by the slave clock to compute the time offset between the slave clock and the master clock, and by extension, with the grandmaster clock. The calculations include computing: $\Delta t = t_2 - t_1 = t_4 - t_3$, the details of which are set forth in IEEE 1588-2008 and are beyond the scope of the present disclosure.

It can be appreciated from the sequence shown in FIG. 3, that PTP relies on a degree of symmetry in the network path between the master clock and the slave clock for the calculations to be accurate. More specifically, the Sync and DelayReq messages (event messages) should be exchanged along the same network path so that their transmission times ($t\text{-ms} = t_2 - t_1$, $t\text{-sm} = t_4 - t_3$) are computed for the same network path, sometimes referred to as path symmetry. An asymmetry in the path between the master clock and the slave clock, when the Sync and DelayReq messages are transmitted on different paths, can introduce an error (half of the asymmetry) to the time offset calculations, resulting in degraded PTP performance across the network. It is noted that path symmetry is not required for the PTP FollowUp and DelayResp messages (general messages). These messages only carry the timing information, but themselves are not time critical, so the path taken to send these messages does not affect the time offset calculations.

Referring to FIG. 2 for a moment, Host 1 sees MLAG device 202 as a single logical device, by operation of the host's LAG interface (LAG0) to the MLAG device. As explained above, when Host 1 sends a packet on its LAG interface, Host 1 will select the egress LAG member interface (et0, et1) in pseudo-random fashion. As such, when Host 1 performs clock synchronization with MLAG 202, the different PTP messages can wind up being placed on different LAG member interfaces, ending up on different peer switches 212 in the MLAG. Accordingly, path asymmetry occurs when egress interface (and hence transmission path) for the PTP Sync message is different from the egress interface (and hence transmission path) for the PTP Delay-Req message. This path asymmetry can also prevent peer switches 212 from having full timing information because Announce messages sent from Host 1 can end up on Peer 1 or Peer 2.

PTP-Like Messages

In accordance with some embodiments of the present disclosure, the peer switches in an MLAG device can forward messages (peer-forwarded messages) between each other to coordinate the processing of PTP messages that each peer switch may receive. Referring to MLAG 102 in FIG. 1, for instance, peer-forwarding can include the exchange of messages between peer switches 122a, 122b via peer link 124. In accordance with some embodiments of the present disclosure, for example, each original PTP Announce, Sync, FollowUp, DelayReq, and DelayResp message can have a corresponding peer-forwarded message. In some embodiments, peer-forwarded messages include Announce-like, Sync-like, FollowUp-like, DelayReq-like, and DelayResp-like messages. Peer-forwarded messages include the same information as their corresponding PTP messages, and thus can be referred to as PTP-like messages. Accordingly, in some embodiments, PTP-like messages can be modifications of their corresponding originally received PTP counterparts. In other embodiments, the information contained in a received PTP message can be encoded or otherwise represented in any suitable manner in its corresponding PTP-like message.

Figure 4:
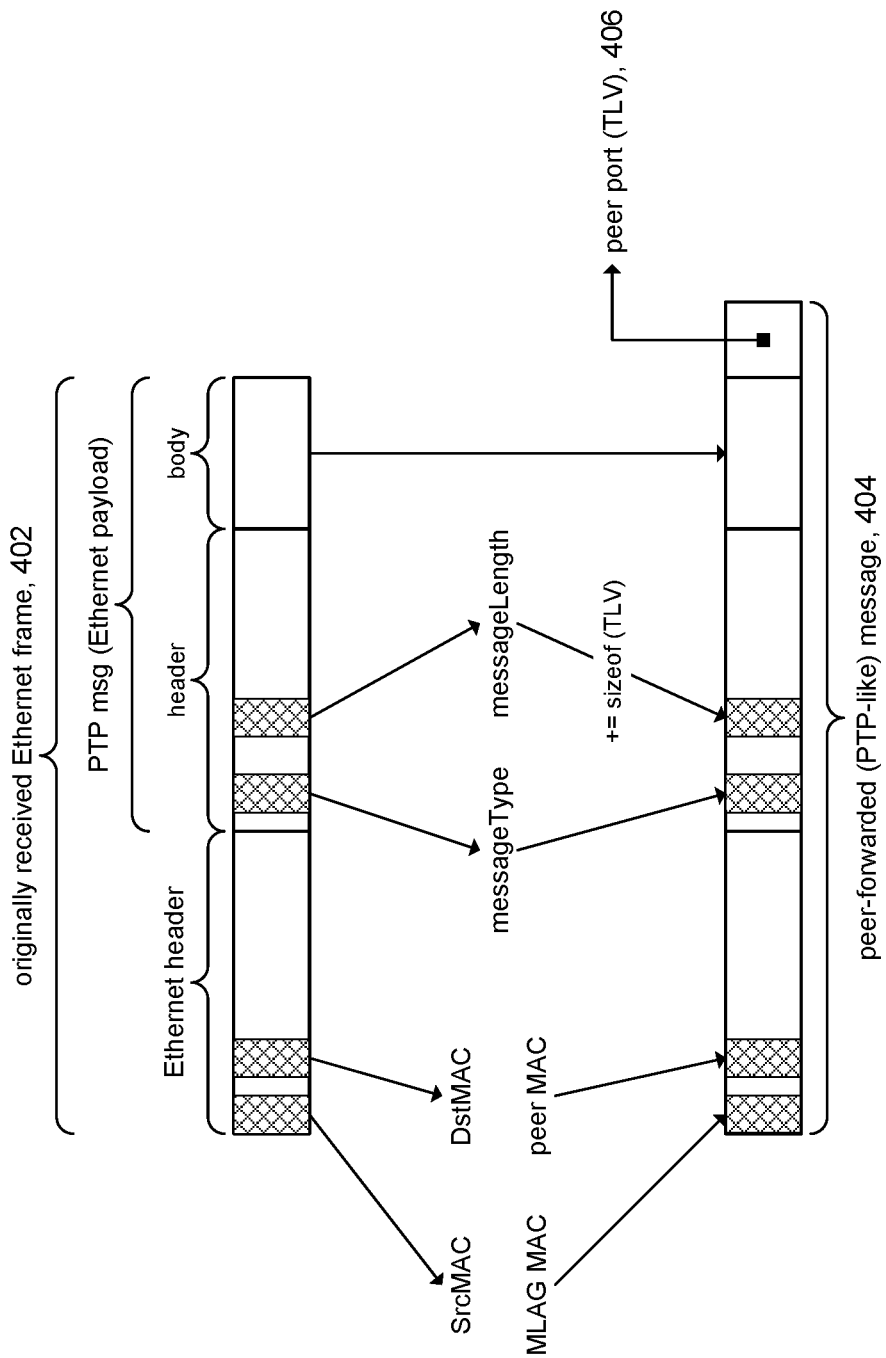
FIG. 4 illustrates an example of a PTP-like message format in accordance with some embodiments.

FIG. 4 illustrates an example of a PTP message and its corresponding PTP-like counterpart. A peer switch (e.g., 122a, FIG. 1) can receive an (original) PTP message in Ethernet frame 402; e.g., the PTP message can be an Announce message, a Sync message, and so on. Ethernet frame 402 includes a header portion and a payload portion that contains the original PTP message. Likewise, the PTP message includes a header portion that contains a messageType data field that indicates the type of the PTP message, e.g., Announce, Sync, FollowUp, DelayReq, and DelayResp. The body of the PTP message contains type-specific information that depends on the message type.

In accordance with the present disclosure, the peer switch can generate a PTP-like message that corresponds to the received original PTP message. In some embodiments, for example, the PTP-like message can be produced by modifying the received original PTP message:
- the source MAC is set to the MLAG system MAC
- the destination MAC is set to the system MAC of the peer switch receiving the peer forwarded message
- a Type-Length-Value (TLV) data instance is attached to the original PTP message. The TLV contains the port identity of the MLAG peer's port on which the original message was received (e.g., the PortIdentity per IEEE1588)

FIG. 4, for example, shows that peer-forwarded message 404 comprises the received Ethernet frame and a peer port identification type-length-value (TLV) 406 appended to the received Ethernet frame. The messageLength data field in the originally received PTP message can be incremented to account for the additional bytes of TLV 406.

General Operations in MLAG Device

The discussion will now turn to a general description of PTP processing in an MLAG device in accordance with the present disclosure. The discussion will then be followed by a more detailed description of processing PTP-like messages in an MLAG device in accordance with the present disclosure.

PTP processing in accordance with the present disclosure can establish PTP state in MLAG peers attached to enabled MLAG interfaces. Disabled MLAG interfaces establish PTP state in accordance with standard PTP processing. Establishing the PTP state is driven by the PTP Sync and PTP DelayReq messages received on the interfaces. In a converged state, the master/slave roles of the MLAG peers, the PTP ports states, etc. are determined and stable. Related PTP Sync and PTP DelayReq messages are placed on the same physical port (interface) for path symmetry. Because a PTP node connected to an MLAG via a LAG interface on its side is not aware of the fact, operation of the MLAG in accordance with the present disclosure ensures that the PTP Sync and PTP DelayReq messages are placed on the same path.

MLAG peers in accordance with the present disclosure generally operate as follows:

The MLAG peer that receives a Sync message from a PTP node on an enabled MLAG interface runs BMCA on a LAG interface that is part of the enabled MLAG interface. The BMCA is run if either (1) the MLAG peer also receives a PTP Announce message on the same MLAG interface from the same PTP node or (2) the MLAG peer receives an Announce-like message from its peer with information identifying the same PTP node and same MLAG interface.

If an MLAG peer synchronizes from a master clock over an enabled MLAG interface, the MLAG peer places a PTP DelayReq message on the same physical interface over which PTP Sync messages from the master clock are received. The MLAG peer will run PTP using information from PTP Announce, FollowUp, and DelayResp messages and/or Announce-like, FollowUp-like, and DelayResp-like messages.

An MLAG peer (slave clock) synchronizing from a master clock over an enabled MLAG interface can maintain various queues:

Queues (buffers) can be provided for PTP Sync messages received from the master clock to match with potentially delayed FollowUp-like messages received from its peer that contain information about the master clock. The MLAG peer may have more than one clock synchronization sequence in progress. The PTP Sync message can include a sequence identifier that identifies a given instance of a clock synchronization sequence. Messages for the same clock synchronization sequence can include the same sequence identifier so they can be matched and processed together. In some embodiments, the MLAG peer can manage several instances of clock synchronization sequences using queues (buffers) that store the initial Sync message associated with each clock synchronization sequence. The MLAG peer can include SyncRx buffer 222 and SyncRxByPeer buffer 224 depicted in FIG. 2, for instance, to store PTP Sync messages associated with respective clock synchronization sequences that are pending (ongoing, in progress) in the MLAG peer (slave clock) and in the master clock.

Likewise, a queue (buffer) can be provided for PTP DelayReq messages sent to the master clock to match with potentially delayed DelayResp-like messages received from the master clock and containing information about the master clock. As depicted in FIG. 2, for example, the MLAG peer can include a DelayReqTx buffer 226 to store PTP DelayReq messages associated with pending clock synchronization sequences.

Both MLAG peers are initially in an "active" state. In the active state, the peers place PTP Announce, Sync, and FollowUp messages on an MLAG interface, until one of the peers receives a PTP DelayReq from a slave clock on its MLAG interface. That peer then remains an "active" peer for this MLAG interface. The active peer peer-forwards a DelayReq-like message to its peer and continues to send PTP Announce, Sync, and FollowUp messages on its MLAG interface. The peer that receives the DelayReq-like message for a particular MLAG interface becomes an "inactive" peer, and being in the inactive state stops sending PTP Announce, Sync, and FollowUp messages on the LAG interface (e.g., host side, FIG. 2) that is part of the MLAG interface. At this point:

if the active peer was originally selected by the slave clock as its master clock, the slave clock will continue synchronizing from the master clock, or if the inactive peer was originally selected by the slave clock as its master clock, the slave clock will switch to the new active peer as the master clock via standard PTP processing.

An inactive peer on an enabled MLAG interface can start a timer, which can be reset each time the inactive peer receives a DelayReq-like message. When the timer expires due to non-receipt of a DelayReq-like message during the timer period, the inactive peer reverts to the active state and resumes sending PTP Announce, Sync, and FollowUp messages on the enabled MLAG interface.

The discussion will now turn to a brief overview of the processing of the various PTP-like messages in accordance with the present disclosure.

Announce-Like Messages

In some embodiments, the Announce-like message can be derived from the original PTP Announce message received from a PTP node over an enabled MLAG interface. In accordance with the present disclosure, an MLAG peer peer-forwards an Announce-like message if it has been determined that its peer is receiving PTP Sync messages on the same enabled MLAG interface from the same PTP node. The MLAG peer receiving the Announce-like message from the sending peer can use the contained PTP information to run the BMCA on a LAG interface that is part of the enabled MLAG interface on which the PTP Announce and Sync messages were received.

Sync-Like Messages

In some embodiments, the Sync-like message can be derived from the original PTP Sync message received from a PTP node over an enabled MLAG interface. In accordance with the present disclosure, an MLAG peer can peer-forward Sync-like messages to its peer. The MLAG peer receiving the Sync-like message from the sending peer now knows it should peer-forward any PTP Announce, FollowUp, and DelayResp messages to the sending peer that arrive on the same MLAG interface from the PTP node.

FollowUp-Like Messages

In some embodiments, the FollowUp-like message can be derived from the original PTP FollowUp message received from a PTP node via an enabled MLAG interface. In accordance with the present disclosure, an MLAG can peer-forward a FollowUp-like message if it has been determined that its peer is receiving PTP Sync messages on the same MLAG interface from the same PTP node. The MLAG peer receiving the FollowUp-like message from the sending peer can then use the PTP information (e.g., $t_1$, FIG. 3) contained in the FollowUp-like message to perform clock synchronization.

DelayReq-like Messages

In some embodiments, the DelayReq-like message can be derived from the original PTP DelayReq message received from a PTP node via an enabled MLAG interface. In accordance with the present disclosure, an MLAG peer can peer-forward DelayReq-like messages to its peer. The MLAG peer receiving DelayReq-like message from the sending peer ceases transmitting PTP Announce, Sync, FollowUp, and DelayResp messages on the LAG interface that is part of the MLAG interface, thus becoming an inactive peer.

DelayResp-Like Messages

In some embodiments, the DelayResp-like message can be derived from the original PTP DelayResp message received from a PTP node via an enabled MLAG interface. In accordance with the present disclosure, an MLAG can peer forward a DelayResp-like message if it has been determined that its peer is receiving PTP Sync messages on the same MLAG interface from the same PTP node. The MLAG peer receiving the DelayResp-like message from the sending peer can then use the contained PTP information (e.g., t3, FIG. 3) to perform clock synchronization.

The discussion will now turn to additional details of processing in an MLAG device ("MLAG") to process PTP and PTP-like messages in accordance with the present disclosure.

Figure 5:
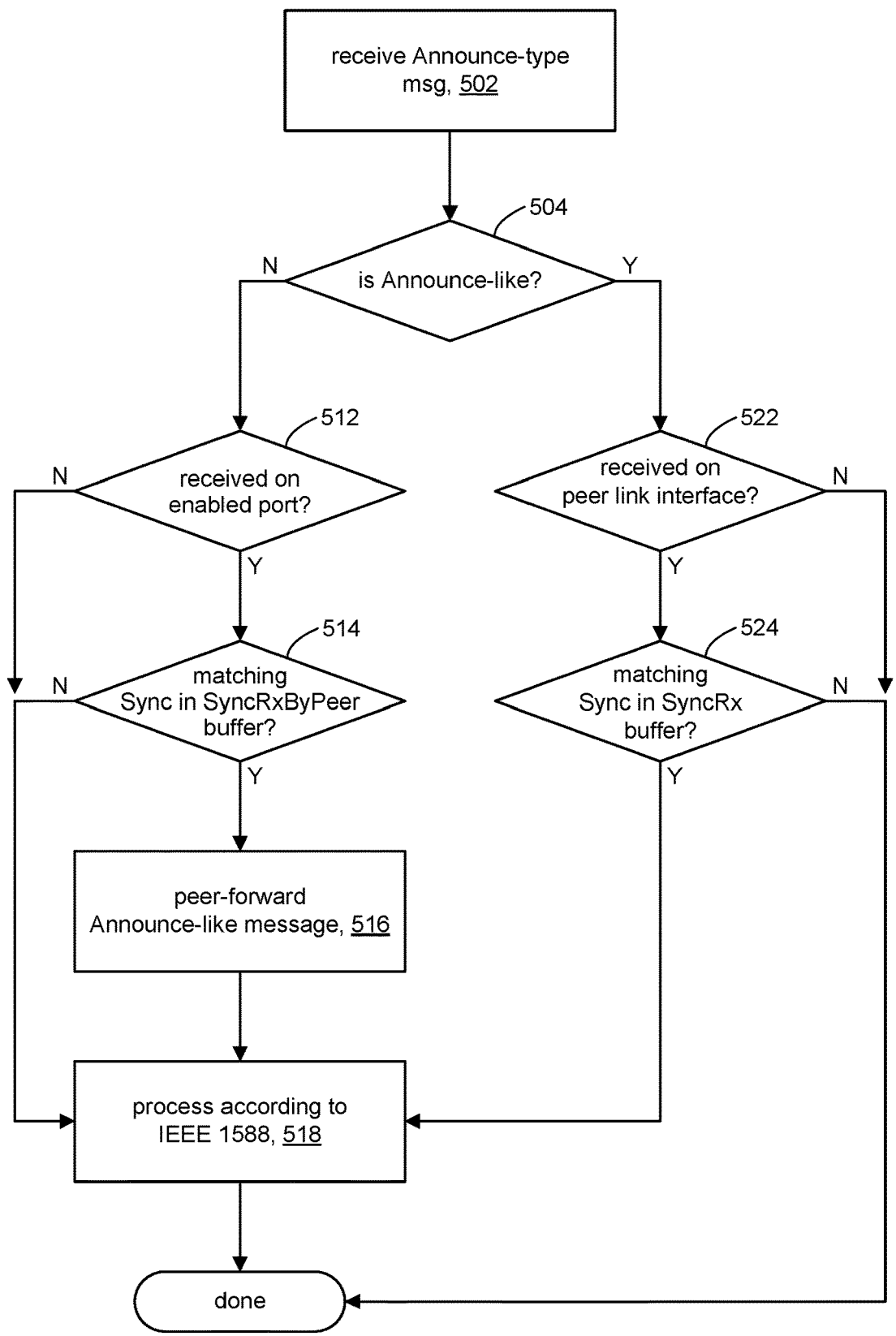
FIGS. 5, 6, 7, 8, and 9 illustrate processing of PTP messages in accordance with some embodiments.

Referring to FIG. 5, a high-level description of operations in a peer switch in an MLAG is shown for processing Announce-type messages in accordance with the present disclosure, including PTP Announce messages and Announce-like messages. In some embodiments, the peer switch can include one or more digital processing units, which when operated, can cause the peer switch to perform processing in accordance with FIG. 5. Digital processing units can include general CPUs that operate by way of executing computer program code stored on a non-volatile computer readable storage medium (e.g., read-only memory, ROM).

Because both switches in an MLAG are typically referred to as peer switches, the following naming convention will be used in the discussion of FIG. 5 to avoid confusion. The MLAG peer that receives the Announce-type message will be referred to as the "peer-forward receiver." The other MLAG peer will be referred to as the "peer-forward sender." Referring to FIG. 1, for example, suppose switch 122a in MLAG 102 receives the Announce-type message; then, for discussion purposes, switch 122a would be the "peer-forward receiver" and switch 122b would be the "peer-forward sender."

At operation 502, the peer-forward receiver can receive an Announce-type message. The Announce-type message can be a PTP Announce message. For example, another PTP node can send a PTP Announce message to the peer-forward receiver as part of PTP processing to establish the master/slave hierarchy. The Announce-type message can be an Announce-like message that was peer-forwarded from the peer-forward sender.

At operation 504, the peer-forward receiver can determine whether the received Announce-type message is a PTP Announce message or an Announce-like message. In some embodiments, for example, the peer-forward receiver can make this determination based on the presence or absence of the peer port identification TLV (e.g., TLV 406, FIG. 4) in the received Announce-type message. If the received Announce-type message includes a TLV, then the message can be deemed an Announce-like message and processing can continue to operation 522 to process the Announce-like message. If the message is a PTP Announce message, then processing can continue to operation 512 to process the PTP Announce message.

Process PTP Announce Message

At operation 512, the peer-forward receiver can determine whether the port that the PTP Announce message came in on is enabled or disabled. As explained above, when the PTP Announce message is received on a disabled port, then processing can proceed directly to operation 518 to process the PTP Announce message according to IEEE 1588-2008. When the PTP Announce message is received on an enabled port, then processing can proceed to operation 514 to process the PTP Announce message in accordance with the present disclosure.

At operation 514, the peer-forward receiver can determine whether the PTP Announce message matches a Sync message that was received by its peer. In some embodiments, the peer-forward receiver can include a buffer (e.g., SyncRxByPeer buffer 224, FIG. 2) that stores Sync messages associated with one or more clock synchronization sequences that are in progress in the peer-forward sender. In some embodiments, the determination whether the PTP Announce message matches a Sync message received by its peer can be made by comparing the clock identifier in the PTP Announce message against clock identifiers in Sync messages stored in the SyncRxByPeer buffer 224. If a match is found, then processing can proceed to operation 516 to peer-forward the PTP Announce message to the peer-forward sender. If a match is not found, processing can proceed to operation 518 to process the PTP Announce message in the peer-forward receiver according to the PTP specification.

At operation 516, the peer-forward receiver can peer-forward an Announce-like message to its peer over the peer link between the peer-forward receiver and the peer-forward sender (e.g., peer link 124, FIG. 1). In some embodiments, for example, the Announce-like message can be generated from the PTP Announce message as depicted in connection with FIG. 4. As will be discussed below, the Announce-like message contains the same clock-related information as in the received PTP Announce message; this allows the peer-forward sender to run the best master clock algorithm (BMCA). Processing can proceed to operation 518 so that the peer-forward receiver likewise can use the PTP Announce message to run BMCA.

Process Announce-Like Message

At operation 522, the peer-forward receiver can determine whether the Announce-like message was received from its peer over the peer link (e.g., peer link 124, FIG. 1). If not, the Announce-like message can be considered invalid and processing can be deemed complete. Otherwise, processing can proceed to operation 524.

At operation 524, the peer-forward receiver can determine whether the Announce-like message matches a Sync message for an ongoing clock synchronization sequence in the peer-forward receiver. As explained above, for example, the peer-forward receiver can include a buffer (e.g., SyncRx buffer 222, FIG. 2) that stores Sync messages associated with clock synchronization sequences that are in progress in the peer-forward receiver. In some embodiments, for example, the determination whether the Announce-like message matches a Sync message in the peer-forward receiver can be made by comparing the clock identifier in the Announce-like message against clock identifiers in Sync messages stored in the SyncRx buffer 222. If a match is found, then processing can proceed to operation 518 to process the Announce-like message in the peer-forward receiver according to the PTP specification. If a match is not found, processing of the Announce-like message can be deemed complete.

Process According to IEEE 1588

At operation 518, the peer-forward receiver can receive a PTP Announce message (e.g., from operations 512, 514, 516) or an Announce-like message from operation 524. In either case, the received message (PTP Announce message or Announce-like message) contains information sufficient to run the best master clock algorithm in accordance with the PTP specification. Processing of the Announce-like message can be deemed complete.

Figure 6:
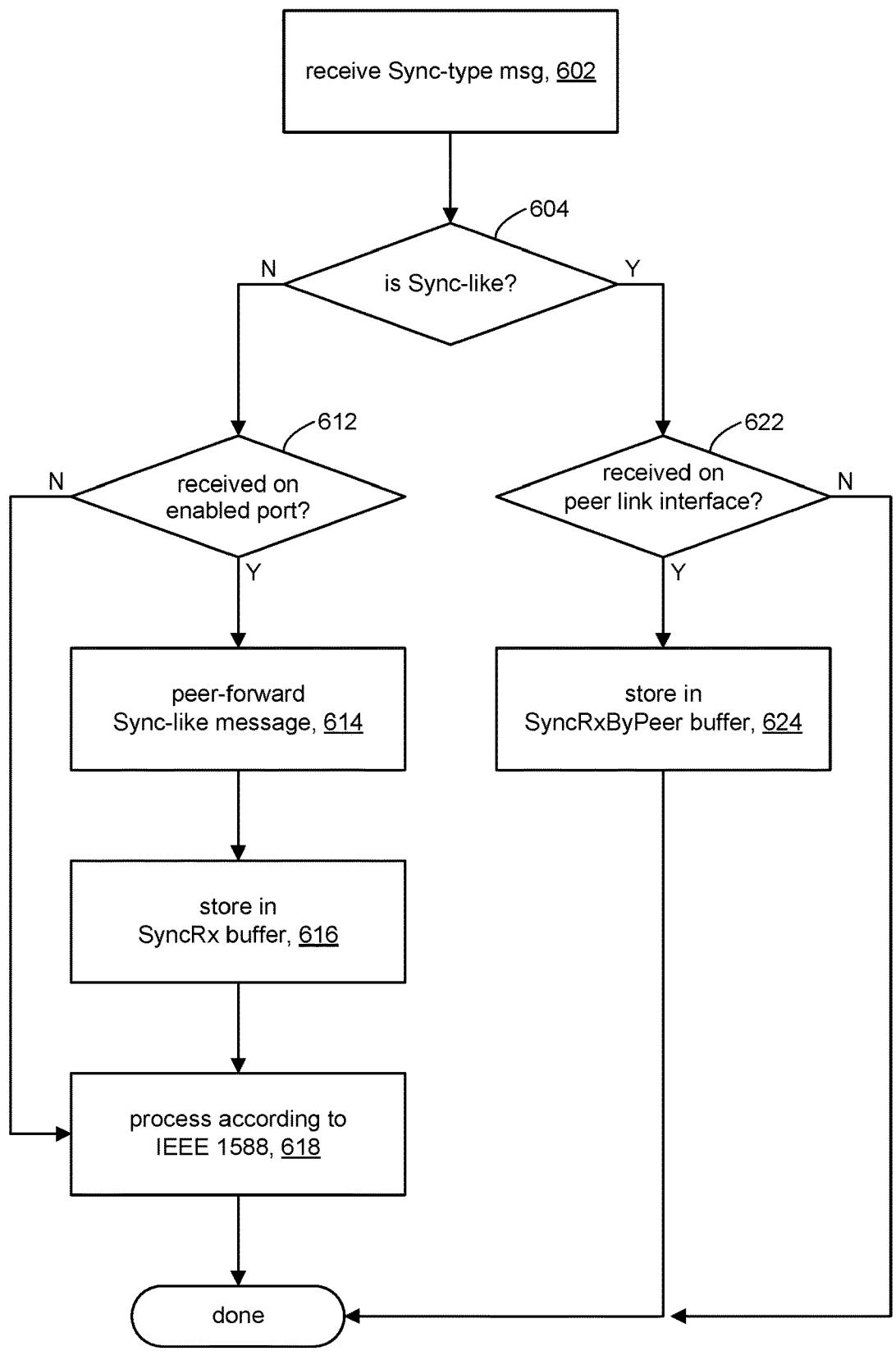

Referring to FIG. 6, a high-level description of operations in a peer switch in an MLAG is shown for processing Sync-type messages in accordance with the present disclosure, including PTP Sync messages and Sync-like messages. In some embodiments, the peer switch can include one or more digital processing units, which when operated, can cause the peer switch to perform processing in accordance with FIG. 6. Digital processing units can include general CPUs that operate by way of executing computer program code stored on a non-volatile computer readable storage medium (e.g., read-only memory, ROM).

The naming convention for the MLAG peers that is adopted in FIG. 5 will be used in the discussion of FIG. 6. The MLAG peer that receives the Sync-type message will be referred to as the "peer-forward receiver." The other MLAG peer will be referred to as the "peer-forward sender." Referring to FIG. 1, for example, suppose switch 122a in MLAG 102 receives the Sync-type message; then, for discussion purposes, switch 122a would be the "peer-forward receiver" and switch 122b would be the "peer-forward sender."

At operation 602, the peer-forward receiver can receive a Sync-type message. The Sync-type message can be a PTP Sync message. For example, another PTP node can send a PTP Sync message to the peer-forward receiver as part of a clock synchronization sequence (FIG. 3). The Sync-type message can be a Sync-like message that was peer-forwarded from the peer-forward sender.

At operation 604, the peer-forward receiver can determine whether the received Sync-type message is a PTP Sync message or a Sync-like message. In some embodiments, for example, the peer-forward receiver can make this determination based on the presence or absence of the peer port identification TLV (e.g., TLV 406, FIG. 4) in the received Sync-type message. If the received Sync-type message includes a TLV, then the message can be deemed a Sync-like message and processing can continue to operation 622 to process the Sync-like message. If the message is a PTP Sync message, then processing can continue to operation 612 to process the PTP Sync message.

Process PTP Sync Message

At operation 612, the peer-forward receiver can determine whether the port that the PTP Sync message came in on is enabled or disabled. When the PTP Sync message is received on a disabled port, then processing can proceed directly to operation 618 to process the PTP Sync message according to IEEE 1588-2008. When the PTP Sync message is received on an enabled port, then processing can proceed to operation 614 to process the PTP Sync message in accordance with the present disclosure.

At operation 614, the peer-forward receiver can peer-forward a Sync-like message to its peer over the peer link between the peer-forward receiver and the peer-forward sender in response to receiving the PTP Sync message. In some embodiments, for example, the Sync-like message can be generated from the received PTP Sync message as depicted in connection with FIG. 4. The received PTP Sync message is deemed the initial, and original, Sync message of a clock synchronization sequence. Peer-forwarding the Sync-like message to the peer-forward sender serves to inform the peer-forward sender that the peer-forward receiver will be processing this clock synchronization sequence.

Figure 7:
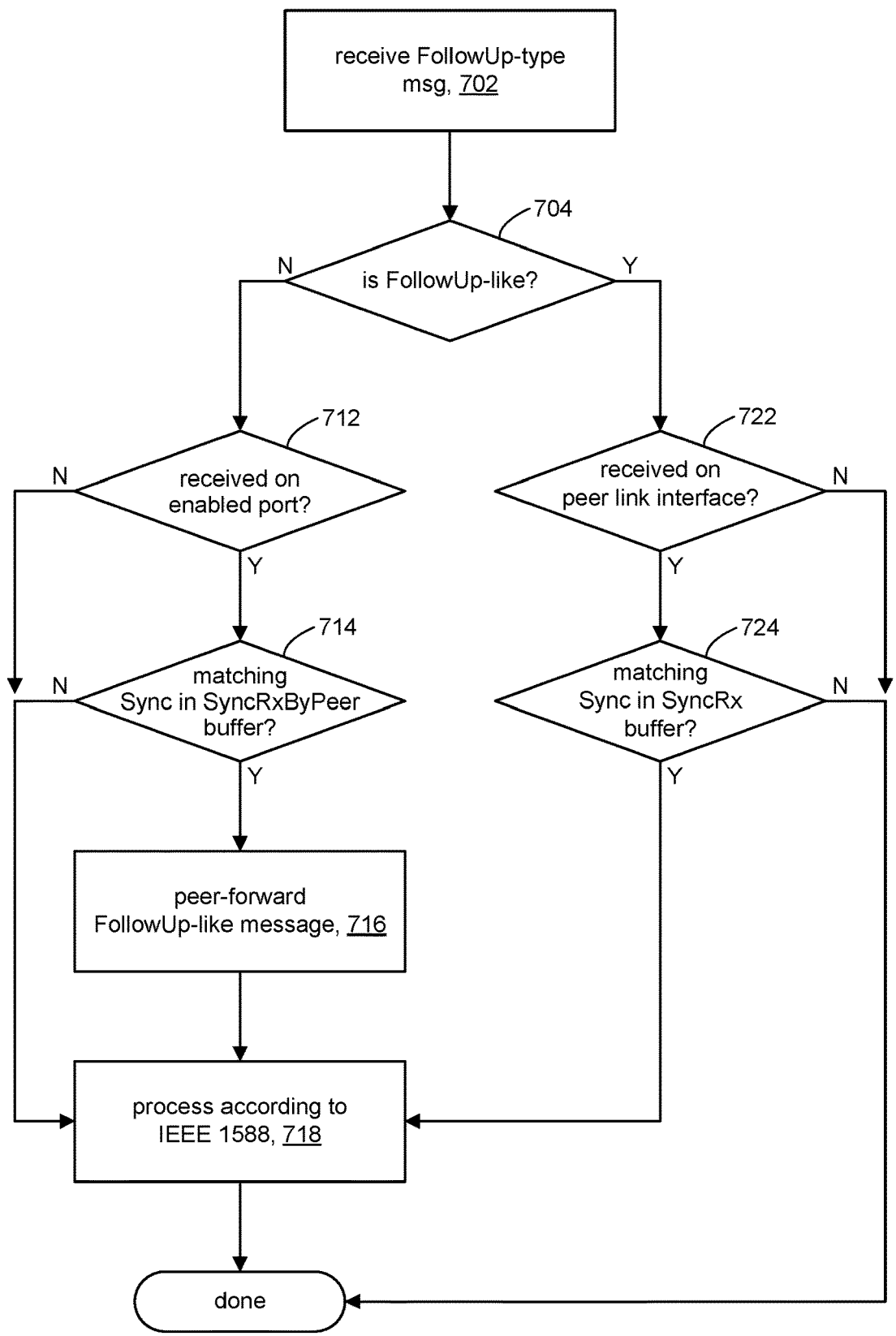

At operation 616, the peer-forward receiver can store the PTP Sync message in its SyncRx buffer 222. As explained above, the SyncRx buffer stores Sync messages for clock synchronization sequences that are in progress in the peer-forward receiver. The received PTP Sync message represents the beginning of a clock synchronization sequence. The PTP Sync message includes the clock identity of the PTP node that sent the message, which as discussed above in FIG. 5 can be used to process PTP Announce messages. The PTP Sync message further includes a sequence identifier that identifies the specific instance of the clock synchronization sequence. The FollowUp, DelayReq, and DelayResp messages that match this instance of the clock synchronization sequence will have the same sequence identifier. Storing the Sync message in SyncRx buffer 222 serves to inform the peer-forward sender to peer-forward the PTP messages associated with the clock synchronization sequence to the peer-forward receiver; e.g., operation 524 (FIG. 5), operation 724 (FIG. 7). Processing can proceed to operation 618 so that the peer-forward receiver can process the PTP Sync message in accordance with the PTP specification.

At operation 618, the peer-forward receiver can process the received PTP Sync message (e.g., from operation 612) in accordance with the PTP specification. Processing of the received PTP Sync message can be deemed complete.

Process Sync-Like Message

At operation 622, the peer-forward receiver can determine whether the Sync-like message was received from its peer over the peer link (e.g., per link 124, FIG. 1). If not, the Sync-like message can be considered invalid and processing can be deemed complete. Otherwise, processing can proceed to operation 624.

Figure 9:
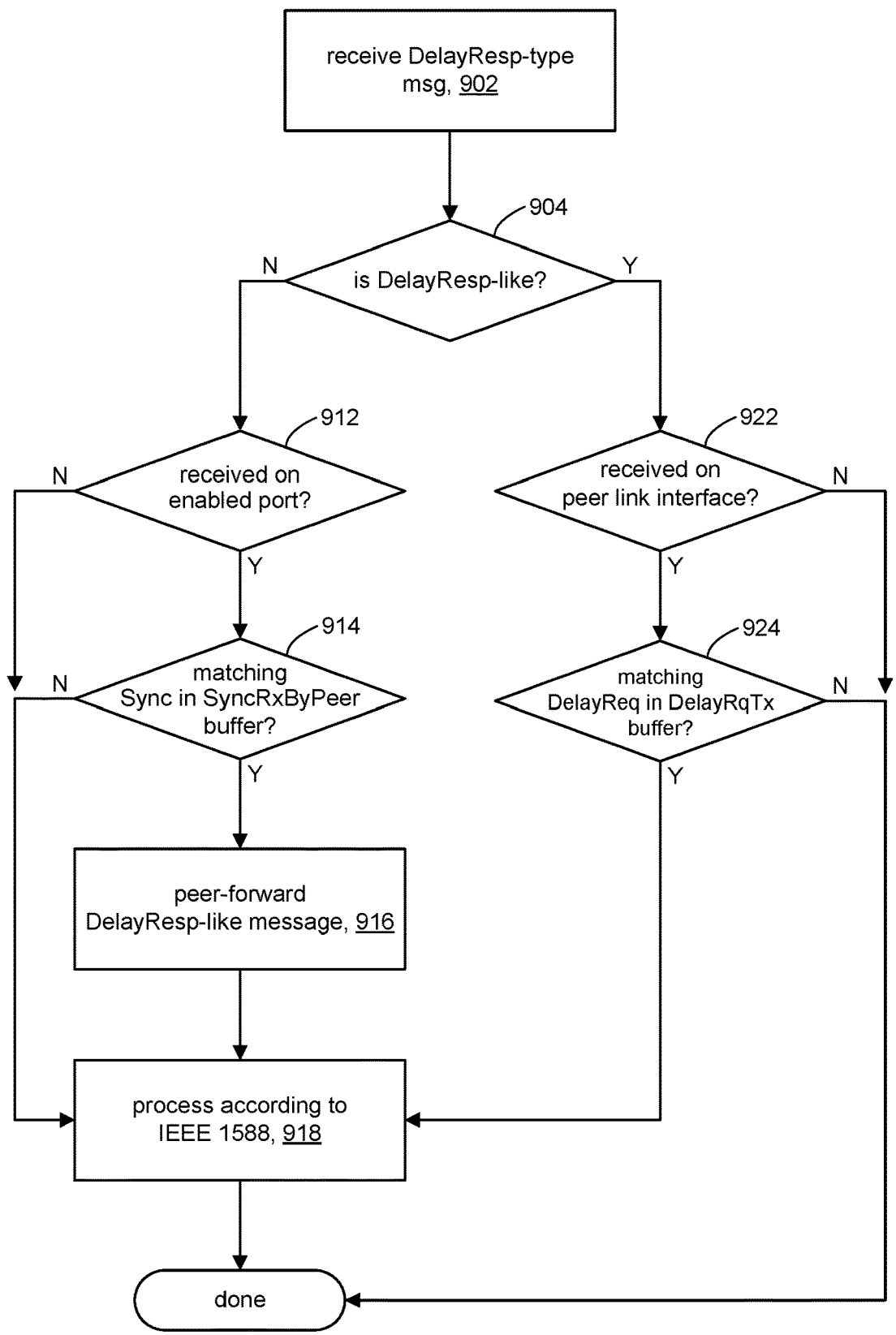

At operation 624, the peer-forward receiver can store the Sync-like message in a buffer associated with the peer-forward sender, for example, SyncRxByPeer buffer 224 (FIG. 2). When the peer-forward receiver receives a Sync-like message from its peer, that means the peer-forward sender received the initial Sync message of a clock synchronization sequence. The peer-forward receiver can store the Sync-like message in order to remember this fact when processing PTP messages associated with the clock synchronization sequence; e.g., operation 514 (FIG. 5), operation 714 (FIG. 7), operation 914 (FIG. 9). In some embodiments, for example, contents of the Sync-like message can be stored in SyncRxByPeer buffer 224. Processing of the Sync-like message can be deemed complete.

Referring to FIG. 7, a high-level description of operations in a peer switch in an MLAG is shown for processing FollowUp-type messages in accordance with the present disclosure, including PTP FollowUp messages and FollowUp-like messages. In some embodiments, the peer switch can include one or more digital processing units, which when operated, can cause the peer switch to perform processing in accordance with FIG. 7. Digital processing units can include general CPUs that operate by way of executing computer program code stored on a non-volatile computer readable storage medium (e.g., read-only memory, ROM).

The naming convention for the MLAG peers that is adopted in FIG. 5 will be used in the discussion of FIG. 7. The MLAG peer that receives the FollowUp-type message will be referred to as the "peer-forward receiver." The other MLAG peer will be referred to as the "peer-forward sender." Referring to FIG. 1, for example, suppose switch 122a in MLAG 102 receives the FollowUp-type message; then, for discussion purposes, switch 122a would be the "peer-forward receiver" and switch 122b would be the "peer-forward sender."

At operation 702, the peer-forward receiver can receive a FollowUp-type message. The FollowUp-type message can be a PTP FollowUp message. For example, another PTP node can send a PTP FollowUp message to the peer-forward receiver as part of a clock synchronization sequence (FIG. 3). The FollowUp-type message can be a FollowUp-like message that was peer-forwarded from the peer-forward sender.

At operation 704, the peer-forward receiver can determine whether the received FollowUp-type message is a PTP FollowUp message or a FollowUp-like message. In some embodiments, for example, the peer-forward receiver can make this determination based on the presence or absence of the peer port identification TLV (e.g., TLV 406, FIG. 4) in the received FollowUp-type message. If the received FollowUp-type message includes a TLV, then the message can be deemed a FollowUp-like message and processing can continue to operation 722 to process the FollowUp-like message. If the message is a PTP FollowUp message, then processing can continue to operation 712 to process the PTP FollowUp message.

Process PTP FollowUp Message

At operation 712, the peer-forward receiver can determine whether the port that the PTP FollowUp message came in on is enabled or disabled. When the PTP FollowUp message is received on a disabled port, then processing can proceed directly to operation 718 to process the PTP FollowUp message according to IEEE 1588-2008. When the PTP FollowUp message is received on an enabled port, then processing can proceed to operation 714 to process the PTP FollowUp message in accordance with the present disclosure.

At operation 714, the peer-forward receiver can determine whether the PTP FollowUp message matches a Sync message that was received by its peer. As explained above, the peer-forward receiver can include SyncRxByPeer buffer 224 (FIG. 2) which stores Sync messages for clock synchronization sequences that are in progress in the peer-forward sender. In some embodiments, the determination whether the PTP FollowUp message matches a Sync message received by its peer can be made by comparing the sequence identifier in the PTP FollowUp message against the sequence identifiers of Sync messages in the SyncRxByPeer buffer 224. If a match is found, then processing can proceed to operation 716 to peer-forward the PTP FollowUp message to the peer-forward sender. If a match is not found, processing can proceed to operation 718 to process the PTP FollowUp message in the peer-forward receiver according to the PTP specification.

At operation 716, the peer-forward receiver can peer-forward a FollowUp-like message to its peer over the peer link between the peer-forward receiver and the peer-forward sender. In some embodiments, for example, the FollowUp-like message can be generated from the PTP FollowUp message as depicted in connection with FIG. 4. The FollowUp-like message contains the same information as in the PTP FollowUp message, namely the timestamp $t_1$ (FIG. 3), which allows the peer-forward sender to synchronize with the master clock. Processing can proceed to operation 718 so that the peer-forward sender can also use the PTP FollowUp message to run the best master clock algorithm.

Process FollowUp-Like Message

At operation 722, the peer-forward receiver can determine whether the FollowUp-like message was received from its peer over the peer link (e.g., per link 124, FIG. 1). If not, the message can be considered invalid and processing can be deemed complete. Otherwise, processing can proceed to operation 724.

At operation 724, the peer-forward receiver can determine whether the FollowUp-like message matches a Sync message for an ongoing clock synchronization sequence in the peer-forward receiver. In some embodiments, for example, the peer-forward receiver can compare the sequence identifier in the FollowUp-like message against the sequence identifiers of Sync messages in the SyncRx buffer 222. If a match is found, then processing can proceed to operation 718 to process the FollowUp-like message in the peer-forward receiver according to the PTP specification. If a match is not found, processing can be deemed complete.

Process According to IEEE 1588

At operation 718, the peer-forward receiver can receive a PTP FollowUp message (e.g., from operations 712, 714) or a FollowUp-like message from operation 724. In either case, the received message (PTP FollowUp message or FollowUp-like message) contains information needed to proceed with the clock synchronization sequence in accordance with the PTP specification.

Figure 8:
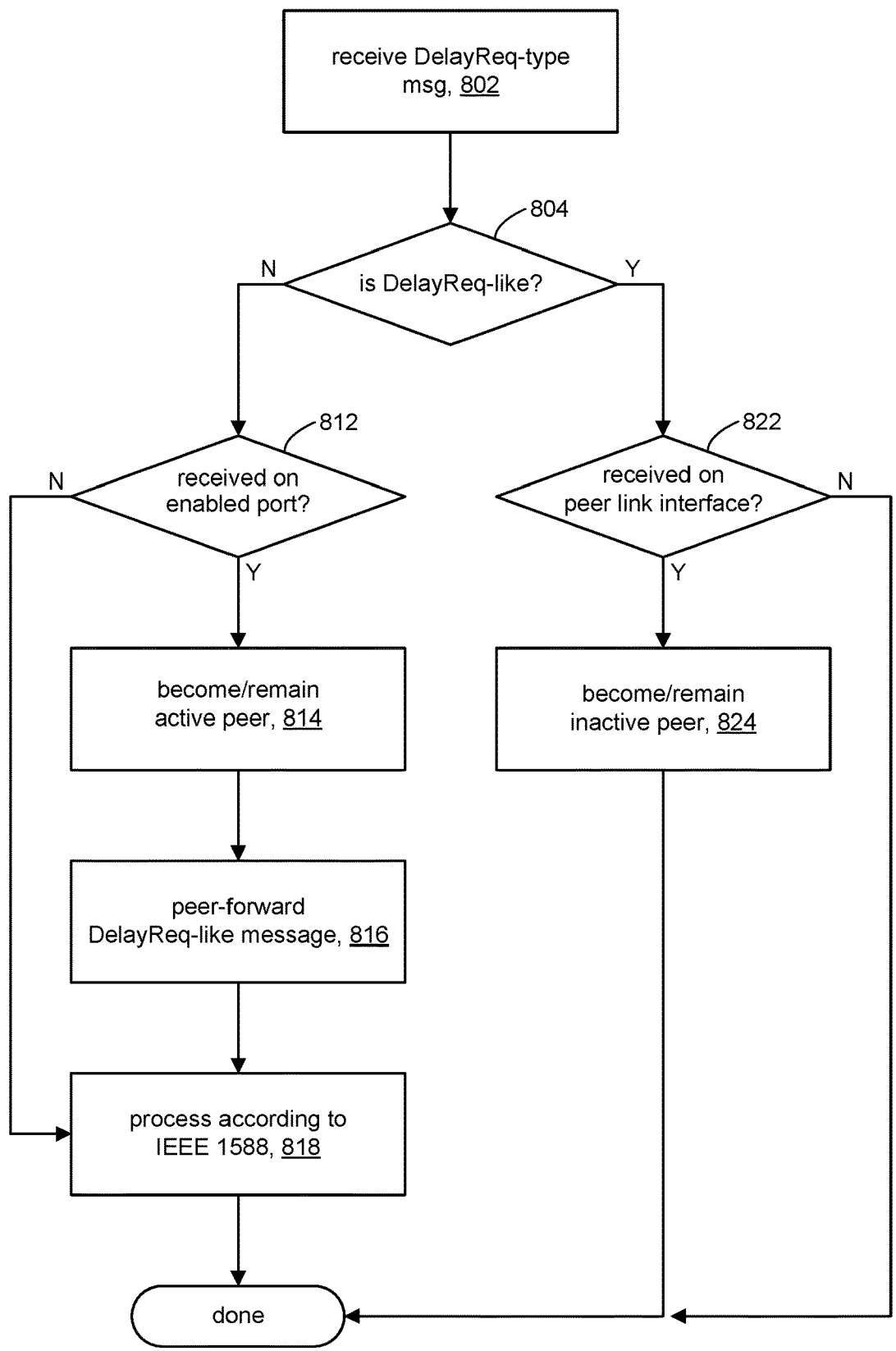

Referring to FIG. 8, a high-level description of operations in a peer switch in an MLAG is shown for processing DelayReq-type messages in accordance with the present disclosure, including PTP DelayReq messages and DelayReq-like messages. In some embodiments, the peer switch can include one or more digital processing units, which when operated, can cause the peer switch to perform processing in accordance with FIG. 8. Digital processing units can include general CPUs that operate by way of executing computer program code stored on a non-volatile computer readable storage medium (e.g., read-only memory, ROM).

The naming convention for the MLAG peers that is adopted in FIG. 5 will be used in the discussion of FIG. 8. The MLAG peer that receives the DelayReq-type message will be referred to as the "peer-forward receiver." The other MLAG peer will be referred to as the "peer-forward sender." Referring to FIG. 1, for example, suppose switch 122a in MLAG 102 receives the DelayReq-type message; then, for discussion purposes, switch 122a would be the "peer-forward receiver" and switch 122b would be the "peer-forward sender."

At operation 802, the peer-forward receiver can receive a DelayReq-type message. The DelayReq-type message can be a PTP DelayReq message. For example, another PTP node can send a PTP DelayReq message to the peer-forward receiver as part of a clock synchronization sequence (FIG. 3). The DelayReq-type message can be a DelayReq-like message that was peer-forwarded from the peer-forward sender.

At operation 804, the peer-forward receiver can determine whether the received DelayReq-type message is a PTP DelayReq message or a DelayReq-like message. In some embodiments, for example, the peer-forward receiver can make this determination based on the presence or absence of the peer port identification TLV (e.g., TLV 406, FIG. 4) in the received DelayReq-type message. If the received DelayReq-type message includes a TLV, then the message can be deemed a DelayReq-like message and processing can continue to operation 822 to process the DelayReq-like message. If the message is a PTP DelayReq message, then processing can continue to operation 812 to process the PTP DelayReq message.

Process PTP DelayReq Message

At operation 812, the peer-forward receiver can determine whether the port that the PTP DelayReq message came in on is enabled or disabled. When the PTP DelayReq message is received on a disabled port, then processing can proceed directly to operation 818 to process the PTP DelayReq message according to IEEE 1588-2008. When the PTP DelayReq message is received on an enabled port, then processing can proceed to operation 814 to process the PTP DelayReq message in accordance with the present disclosure.

At operation 814, the peer-forward receiver can become/remain the active peer in response to receiving the PTP DelayReq message. In accordance with the present disclosure, both peer-forward receiver and the peer-forward sender are initially active, and place PTP Announce, Sync, and FollowUp messages on their respective interface, until one of them receives PTP DelayReq message and becomes the active peer. Accordingly, if the peer-forward receiver is already active, then the peer-forward receiver remains active and continues to send Announce, Sync, FollowUp, and DelayResp messages. Further in accordance with the present disclosure, the peer-forward receiver or the peer-forward sender can become inactive per operation 824 below. Accordingly, if the peer-forward receiver is inactive, then the peer-forward receiver becomes active in response to receiving the PTP DelayReq message and resumes sending Announce, Sync, FollowUp, and DelayResp messages.

At operation 816, the peer-forward receiver can peer-forward a DelayReq-like message to its peer in further response to receiving the PTP DelayReq message over the peer link between the peer-forward receiver and the peer-forward sender. In some embodiments, for example, the DelayReq-like message can be generated from the received PTP DelayReq message as depicted in connection with FIG. 4. As discussed below, peer-forwarding the DelayReq-like message to the peer-forward sender serves to inform the peer-forward sender to cease transmitting Announce, Sync, FollowUp, and DelayResp messages associated with a clock synchronization sequence identified by the sequence identifier in the DelayReq-like message. Processing can proceed to operation 818 so that the peer-forward receiver can process the PTP DelayReq message in accordance with the PTP specification.

At operation 818, the peer-forward receiver can process the received PTP DelayReq message (e.g., from operation 812) in accordance with the PTP specification. Processing of the received PTP DelayReq message can be deemed complete.

Process DelayReq-Like Message

At operation 822, the peer-forward receiver can determine whether the DelayReq-like message was received from its peer over the peer link (e.g., per link 124, FIG. 1). If not, the DelayReq-like message can be considered invalid and processing can be deemed complete. Otherwise, processing can proceed to operation 824.

At operation 824, the peer-forward receiver can become/remain the inactive peer in response to receiving the DelayReq-like message. The peer-forward receiver, being an inactive peer, ceases sending Announce, Sync, FollowUp, and DelayResp messages, and is not receiving DelayReq messages from the slave clock. In accordance with the present disclosure, the inactive peer can start a timer, which can be reset each time the inactive peer receives a DelayReq-like message. When the timer expires due to non-receipt of a DelayReq-like message during the timer period, the inactive peer becomes an active peer and resumes sending PTP Announce, Sync, and FollowUp messages. Processing of the DelayReq-like message can be deemed complete.

Referring to FIG. 9, a high-level description of operations in a peer switch in an MLAG is shown for processing DelayResp-type messages in accordance with the present disclosure, including PTP DelayResp messages and DelayResp-like messages. In some embodiments, the peer switch can include one or more digital processing units, which when operated, can cause the peer switch to perform processing in accordance with FIG. 9. Digital processing units can include general CPUs that operate by way of executing computer program code stored on a non-volatile computer readable storage medium (e.g., read-only memory, ROM).

The naming convention for the MLAG peers that is adopted in FIG. 5 will be used in the discussion of FIG. 9. The MLAG peer that receives the DelayResp-type message will be referred to as the "peer-forward receiver." The other MLAG peer will be referred to as the "peer-forward sender." Referring to FIG. 1, for example, suppose switch 122*a* in MLAG 102 receives the DelayResp-type message; then, for discussion purposes, switch 122*a* would be the "peer-forward receiver" and switch 122*b* would be the "peer-forward sender."

At operation 902, the peer-forward receiver can receive a DelayResp-type message. The DelayResp-type message can be a PTP DelayResp message. For example, another PTP node can send a PTP DelayResp message to the peer-forward receiver as part of a clock synchronization sequence (FIG. 3). The DelayResp-type message can be a DelayResp-like message that was peer-forwarded from the peer-forward sender.

At operation 904, the peer-forward receiver can determine whether the received DelayResp-type message is a PTP DelayResp message or a DelayResp-like message. In some embodiments, for example, the peer-forward receiver can make this determination based on the presence or absence of the peer port identification TLV (e.g., TLV 406, FIG. 4) in the received DelayResp-type message. If the received DelayResp-type message includes a TLV, then the message can be deemed a DelayResp-like message and processing can continue to operation 922 to process the DelayResp-like message. If the message is a PTP DelayResp message, then processing can continue to operation 912 to process the PTP DelayResp message.

Process PTP DelayResp Message

At operation 912, the peer-forward receiver can determine whether the port that the PTP DelayResp message came in on is enabled or disabled. When the PTP DelayResp message is received on a disabled port, then processing can proceed directly to operation 918 to process the PTP DelayResp message according to IEEE 1588-2008. When the PTP DelayResp message is received on an enabled port, then processing can proceed to operation 914 to process the PTP DelayResp message in accordance with the present disclosure.

At operation 914, the peer-forward receiver can determine whether the PTP DelayResp message matches a Sync message that was received by its peer. As explained above, the peer-forward receiver can include SyncRxByPeer buffer 224 (FIG. 2), which stores Sync messages for clock synchronization sequences that are in progress in the peer-forward sender. In some embodiments, the determination whether the PTP DelayResp message matches a Sync message received by its peer can be made by comparing the sequence identifier in the PTP DelayResp message against the sequence identifiers of Sync messages in the SyncRxByPeer buffer 224. If a match is found, then processing can proceed to operation 916 to peer-forward the PTP DelayResp message to the peer-forward sender. If a match is not found, processing can proceed to operation 918 to process the PTP DelayResp message in the peer-forward receiver according to the PTP specification.

At operation 916, the peer-forward receiver can peer-forward a DelayResp-like message to its peer over the peer link between the peer-forward receiver and the peer-forward sender. In some embodiments, for example, the DelayResp-like message can be generated from the PTP DelayResp message as depicted in connection with FIG. 4. The DelayResp-like message contains the same information as in the PTP DelayResp message, namely the timestamp $t_4$ (FIG. 3), which allows the peer-forward sender to synchronize with the master clock. Processing can proceed to operation 918 so that the peer-forward sender can also use the PTP DelayResp message to run the best master clock algorithm.

Process DelayResp-Like Message

At operation 922, the peer-forward receiver can determine whether the DelayResp-like message was received from its peer over the peer link (e.g., per link 124, FIG. 1). If not, the message can be considered invalid and processing can be deemed complete. Otherwise, processing can proceed to operation 924.

At operation 924, the peer-forward receiver can determine if the DelayResp-like message matches the DelayReq message of an ongoing clock synchronization sequence. As explained above, for example, the peer-forward receiver can include a buffer (e.g., DelayReqTx buffer 226, FIG. 2) that stores DelayReq messages associated with clock synchronization sequences that are in progress in the peer-forward receiver and in particular information associated with the message is stored in the DelayReqTx buffer when the message is sent. In some embodiments, the determination whether the DelayResp-like message matches a DelayReq message in the peer-forward receiver can be made by comparing the clock identifier in the DelayResp-like message against clock identifiers in DelayReq messages stored in the DelayReqTx buffer 226. If a match is found, then processing can proceed to operation 918 to process the DelayResp-like message in the peer-forward receiver according to the PTP specification. If a match is not found, processing can be deemed complete.

Process According to IEEE 1588

At operation 918, the peer-forward receiver can receive a PTP DelayResp message (e.g., from operations 912, 914) or a DelayResp-like message from operation 924. In either case, the received message (PTP DelayResp message or DelayResp-like message) contains information needed to proceed with the clock synchronization sequence in accordance with the PTP specification. Processing can be deemed complete.

The discussion will now turn to some use cases to illustrate the processing of PTP messages in an MLAG in accordance with the present disclosure. The relative timing of the sequencing shown in the following use-case figures is indicated by circled numbers referred to as time indices.

Use Case 1

Figure 10:
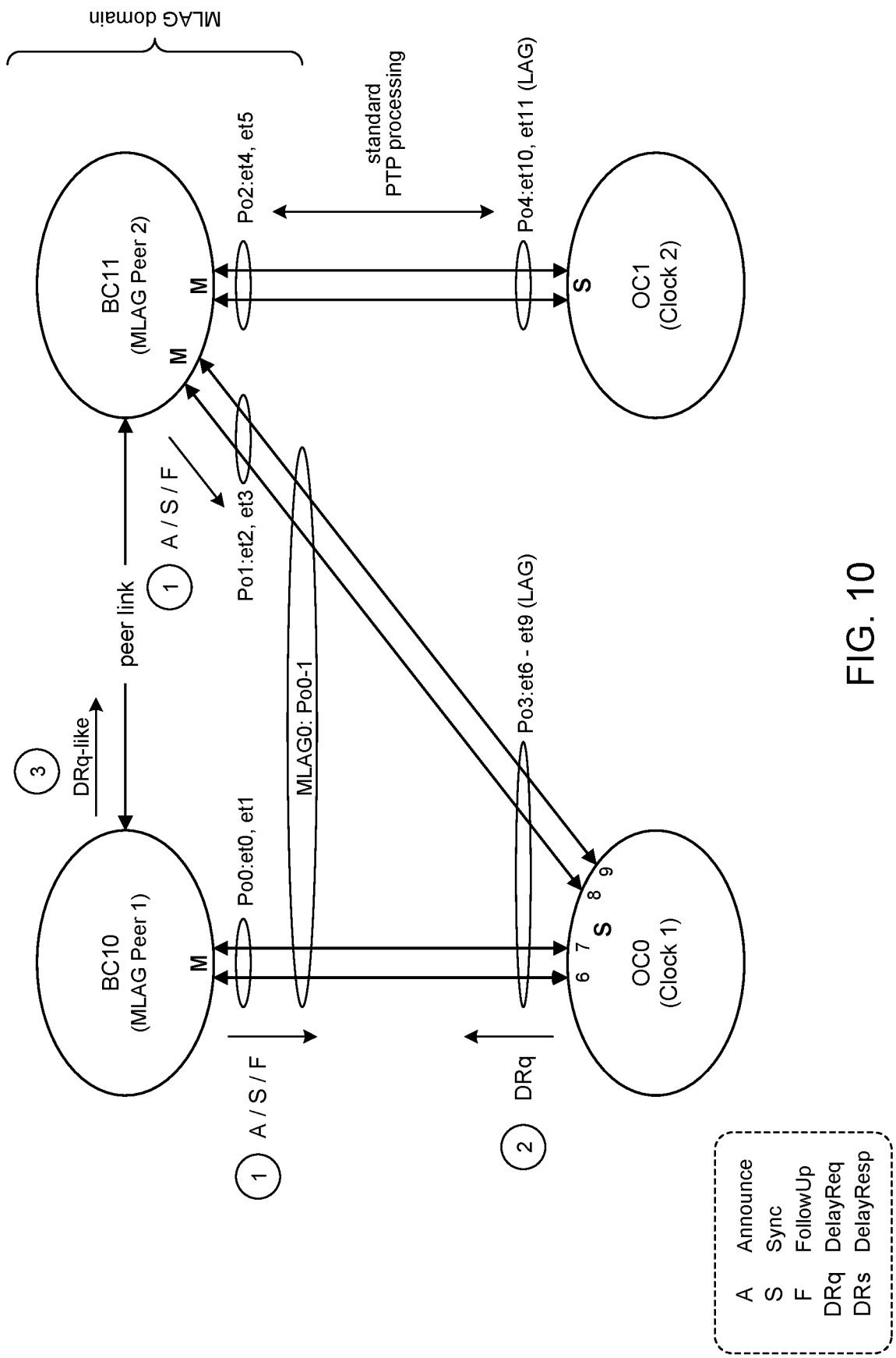
FIG. 10 depicts a use case in accordance with some embodiments.

FIG. 10 shows an MLAG domain and two clocks, Clock 1 and Clock 2. The clocks can be any electronic device that has a clock and can run the IEEE 1588-2008 PTP protocol to synchronize their clocks. The MLAG domain comprises Peer switches 1 and 2. Peers 1 and 2 are in data communication with each other over a peer link. Peer 1 is configured to define a port Po0 comprising physical ports et0 and et1. Peer 2 is configured to define two ports Po1 (comprising physical ports et2 and et3) and Po2 (comprising physical ports et4 and et5). The MLAG domain is configured with MLAG interface MLAG0 comprising member ports Po0 from Peer 1 and Po1 from Peer 2.

The ports (et6, et7, et8, et9) on Clock 1 are configured as LAG interface Po3, which is connected to MLAG0. When Clock 1 transmits a packet on LAG interface Po3, the member port (et6-et9) for egress will be selected in pseudo-random fashion. For example, the member port can be selected by applying a hash function on the outmost header of the packet; e.g., source and destination MAC addresses, port, etc. As can be seen in FIG. 10, the packet will go to Peer 1 or to Peer 2 depending on the outcome of the hash function.

The ports (et10, et11) on Clock 2 are configured as LAG interface Po4, which is connected to port Po2 on Peer 2 in the MLAG domain. It can be seen that port Po2 on Peer 2 is a conventional LAG interface because the constituent physical ports of Po2 (et4, et5) are on the same switch, namely Peer 2. As such, all packets from Clock 2 will be sent to Peer 2.

With respect to PTP processing, Peers 1 and 2 can be deemed to be boundary clocks (BC10 and BC11) and Clocks 1 and 2 can be deemed to be ordinary clocks (OC0 and OC1). For purposes of discussion, suppose that the BC10 and BC11 clocks are better than the OC0 and OC1 clocks. In a converged state, OC0 will have only one master, either Peer1 or Peer2. Initially, both Peer1 and Peer2 are potential masters for OC0. When the BMCA algorithm in OC0 decides which one to synchronize from, either Peer1 or Peer2 will become its master. Once the DelayReq message is sent by OC0, depending on which peer receives it, the receiving peer will become the active peer and the other peer will become inactive (e.g., via peer-forwarding of the DelayReq-like explained above). At this point, the active peer will continue to send all PTP messages, the inactive peer will cease to send any. OC0 will see that the inactive peer has gone from the network and will naturally either remain or switch to the active peer as its master. For the remaining discussion of PTP processing, the "BC" and "OC" nomenclature will be used in place of Peers 1 and 2 and Clocks 1 and 2.

It is noted that the BC11 and OC1 pair represent a regular connection between two clocks from the perspective of PTP processing because OC1 is connected only to BC11. The pair can establish the master/slave relation between them using conventional PTP processing according to IEEE 1588-2008, and likewise OC1 can synchronize its clock from BC11 according to conventional PTP processing. The remaining discussion will therefore consider PTP processing in BC10 and BC11 as master clocks to OC0.

The discussion of PTP processing in accordance with the present disclosure can begin at some time prior to time index 1, where BC10 and BC11 are both active peers and, as active peers, both can send PTP Announce, Sync, and FollowUp messages on OC0's LAG interface. For example, when BC10 and BC11 send PTP Announce messages, OC0 will run the BMCA using its own clock data and clock data contained in the PTP Announce messages to determine a master/slave relation. Suppose for discussion purposes, that the BMCA running in OC0 selects BC11 as its master clock and makes OC0 a slave clock.

At time index 2, per the PTP standard, OC0 will transmit over its LAG interface (Po3) a PTP DelayReq message to BC11. However, by operation of a LAG interface, the message can be sent over any member port of the LAG, and as explained above due to the pseudo-random nature of selecting a LAG member, the message can end up either at BC10 or BC11. Therefore, although OC0 the PTP DelayReq message targets BC11 (e.g., by virtue of containing the clock identifier of BC11), operation of the LAG interface can send the message to BC10 instead of the intended receiver BC11.

For example, applying a hash function on the outer header of the PTP DelayReq message, suppose LAG member et7 is selected so that the PTP DelayReq message is received by BC10. BC10 will receive and process the PTP DelayReq message from OC0 in accordance with FIG. 8. BC10 will remain an active peer (operation 814) and in accordance with the present disclosure will peer-forward a DelayReq-like message to BC11 (operation 816) over the peer link at time index 3.

Meanwhile, BC11 will respond to receiving the DelayReq-like message from BC10 in accordance with FIG. 8. BC11 will change from being an active peer to become an inactive peer (operation 824), and in accordance with the present disclosure, BC11 as an inactive peer will cease sending PTP Announce, Sync, and FollowUp messages to OC0. BC10 remains an active peer and continues sending PTP Announce, Sync, and FollowUp messages to OC0. OC0 will switch to BC10 as its master clock and will issue DelayReq messages that target BC10 (e.g., contains BC10's clock identifier). Because the hash operation in the LAG interface is the same, the PTP message will continue to go to BC10, this time however, as the intended receiver. Note that the DelayReq-like message makes BC11 "inactive" only with respect to the port (Po1) on BC11 which is a member of MLAG0. The determination to become inactive for a given port does not apply to other ports on BC11 that may be running PTP.

OC0 will continue to run BMCA as it receives PTP Announce messages. However, because OC0 no longer receives PTP Announce messages from BC11, the BMCA running on OC0 will select BC10 as the new master clock. Subsequent PTP DelayReq messages sent by OC0 will continue to go to BC10 because the outer headers in the subsequent PTP DelayReq messages remain the same as in the first PTP DelayReq message sent to BC10, and so clock synchronization will continue with BC10.

We can see that, the DelayReq-like message ensures path symmetry with respect to the PTP Sync and DelayReq messages for clock synchronization, even though OC0's initial PTP DelayReq message can be sent on any LAG member and hence can wind up on either master clock, BC10 or BC11. By sending the DelayReq-like message from the master clock that receives the initial PTP DelayReq message (in our example, BC10) to the peer (i.e., BC11), that peer can be made inactive thus ensuring that PTP Sync and DelayReq messages are exchanged between OC0 and the same master clock. The DelayReq-like message ensures that the PTP event messages, such as Sync and DelayReq, between an MLAG peer master and an OC node that is connected to the master via an MLAG interface are placed on the same physical path, thus avoiding introducing any path asymmetry between the nodes.

Use Case 2

Figure 11:
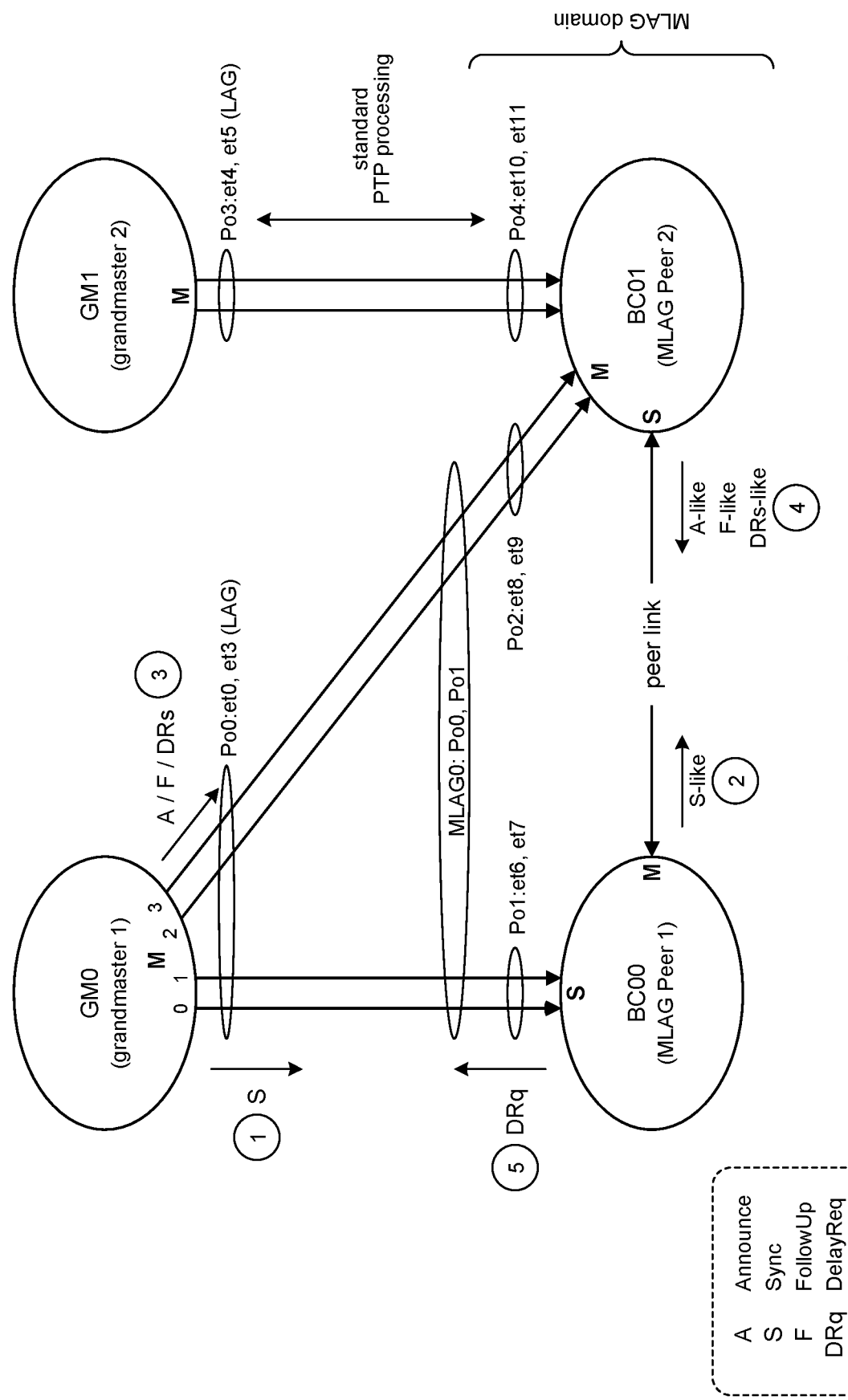
FIG. 11 depicts another use case in accordance with some embodiments.

FIG. 11 shows an MLAG domain and two grandmaster clocks 1 and 2. The MLAG domain comprises Peer switches 1 and 2. Peers 1 and 2 are in data communication with each other over a peer link. Peer 1 is configured to define a port Po0 comprising physical ports et6 and et7. Peer 2 is configured to define two ports Po2 (comprising physical ports et8 and et9) and Po4 (comprising physical ports et10 and et11). The MLAG domain is configured with MLAG interface MLAG0 comprising member ports Po0 from Peer 1 and Po2 from Peer 2.

The ports (et0-et3) on grandmaster clock 1 are configured as LAG interface Po0, which is connected to MLAG0. The ports (et4, et5) on grandmaster clock 2 are configured as LAG interface Po3, which is connected to port Po4 on Peer 2 in the MLAG domain. It can be seen that port Po4 on Peer 2 is a conventional LAG interface because the constituent physical ports of Po4 (et10, et11) are on the same switch, namely Peer 2. As such, all packets from grandmaster clock 2 will be sent to Peer 2.

In the use case shown in FIG. 11, Peers 1 and 2 are boundary clocks (BC00 and BC01) and operate as slave clocks to grandmaster clocks 1 and 2. For the remaining discussion of PTP processing, the "BC" and "GM" nomenclature will be used in place of Peers 1 and 2 and grandmaster clocks 1 and 2, respectively.

It is noted that the GM1 and BC01 pair represent a regular connection between two clocks from the perspective of PTP processing because they are connected by a single LAG link. Clock synchronization between the pair can proceed according to conventional PTP processing. It is further noted that the clock hierarchy and clock synchronization between the MLAG peers can proceed according to conventional PTP processing because the processing will take place across the same link. The remaining description of FIG. 11 will therefore consider PTP processing in BC00 and BC01 as slave clocks to GM0. This use case assumes GM0 is the better clock between GM0 and GM1.

Suppose at time index 1, GM0 sends a PTP Sync message to BC00. In response, BC00 will process the PTP Sync message in accordance with FIG. 6. At time index 2 BC00 peer-forwards the message to BC01 (operation 614). BC00 will store the PTP Sync message in its SyncRx buffer (operation 616). Meanwhile, BC01 will receive the peer-forwarded Sync-like message and in response will process the message in accordance with FIG. 6. Accordingly, BC01 will store the Sync-like message in its SyncRxByPeer buffer to indicate that its peer (BC00) has received a PTP Sync message.

At time index 3, suppose GM0 sends one of the PTP general messages (Announce, FollowUp, DelayResp) to BC01. BC01 will now know to peer-forward these messages to its peer BC00. Consider, for example, BC01 receiving a PTP FollowUp message. BC01 will process the message according to FIG. 7. The decision at operation 714 will evaluate to YES because the Sync-like message stored in BC01's SyncRxByPeer buffer will match the received PTP FollowUp message. BC01 will therefore peer-forward the PTP FollowUp message to BC00 at time index 4. A review of FIGS. 5 and 9 will show the same peer-forwarding action when BC01 receives PTP Announce and PTP DelayResp messages, respectively.

When BC00 receives an Announce-like message, FollowUp-like message, or DelayResp-like message from BC01, BC00 will process the received message according to respective FIGS. 5, 7, and 9. Consider, for instance, when BC00 receives a FollowUp-like message. Processing will proceed according to FIG. 7. The decision at operation 724 will evaluate to YES because the Sync-like message stored in BC00's SyncRx buffer will match the received FollowUp-like message; BC00 will therefore process the FollowUp-like message as if it were a PTP FollowUp message (operation 718) thus continuing the clock synchronization sequence. For example, at time index 5, BC00 will send a PTP DelayReq message to GM0.

When BC00 receives an Announce-like message from BC01, BC00 will process the message as if it were a PTP Announce message from GM0. BC00 has a PTP Sync message in the SyncRx buffer directly from GM0. It receives an Announce-like message from BC01 which contains the PTP Announce message from GM0. Since BC00 knows it receives a Sync message from GM0, it knows it potentially can use GM0 as its master (ensuring that Sync and DelayReq messages are on the same physical path). So BC00 can now use the Announce message from GM0 (via Announce-like message) in its BMCA and might choose to synchronize with GM0 if it is the best master available. In the essence, everything is driven by the Sync message: the clock that receives the Sync message from a GM will be running BMCA for this clock and might choose it as master. The rest of PTP information from this GM it might be receiving via PTP-like messages via its MLAG peer or directly from GM.

Figure 12:
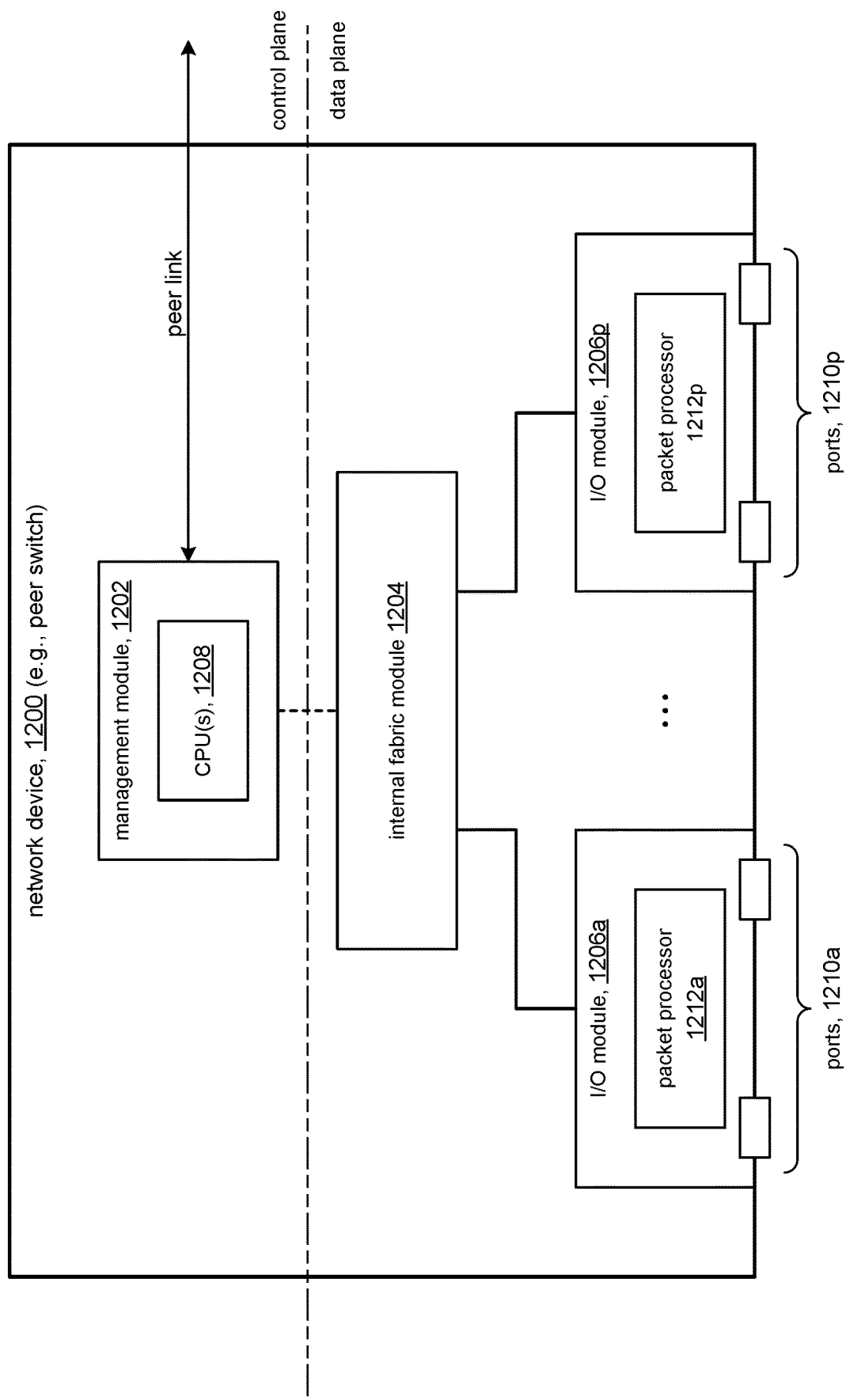
FIG. 12 illustrates details of a peer switch in accordance with some embodiments.

FIG. 12 depicts an example of a switch 1200 in accordance with some embodiments of the present disclosure. In some embodiments, switch 1200 can be a peer switch (e.g., 122a, FIG. 1) in an MLAG domain. As shown, switch 1200 includes a management module 1202, an internal fabric module 1204, and a number of I/O modules 1206a-1206p. Management module 1202 includes the control plane (also referred to as control layer) of switch 1200 and can include one or more management CPUs 1208 for managing and controlling operation of switch 1200 in accordance with the present disclosure. Each management CPU 1208 can be a general purpose processor, such as an Intel®/AMD® x86 or ARM® processor, that operates under the control of software stored in a memory (not shown), such as dynamic random access memory (DRAM). Control plane refers to all the functions and processes that determine which path to use, such as routing protocols, spanning tree, and the like. In some embodiments, the control plane can provide PTP processing in accordance with the present disclosure, for example, as set forth in FIGS. 5-9.

Internal fabric module 1204 and I/O modules 1206a-1206p collectively represent the data plane of switch 1200 (also referred to as data layer, forwarding plane, etc.). Internal fabric module 1204 is configured to interconnect the various other modules of switch 1200. Each I/O module 1206a-1206p includes one or more input/output ports 1210a-1210p that are used by switch 1200 to send and receive network packets. Each I/O module 1206a-1206p can also include a packet processor 1212a-1212p. Each packet processor 1212a-1212p can comprise a forwarding hardware component (e.g., application specific integrated circuit (ASIC), field programmable gate array (FPGA), digital processing unit, graphics coprocessors, content-addressable memory, and the like) configured to make wire speed decisions on how to handle incoming (ingress) and outgoing (egress) network packets. In accordance with some embodiments some aspects of the present disclosure can be performed wholly within the data plane.

Further Examples

In accordance with the present disclosure, a method in a peer group comprising a first peer switch and a second peer switch includes: the peer group receiving a synchronization message from a network element in connection with a synchronization session between the first peer switch and the network element, the peer group and the network element connected by a plurality of links, wherein the synchronization message is received by the first peer switch on a first link between the first peer switch and the network element; the first peer switch forwarding a message to the second peer switch based on the received synchronization message; in response to receiving a forwarded message of a first kind, the second peer switch forwarding to the first peer switch subsequent synchronization messages in connection with the synchronization session that are received from the network element on a second link between the second peer switch and the network element, wherein the first peer switch conducts the entire synchronization session with the network element on the first link using synchronization messages forwarded from the second peer switch; and in response to receiving a forwarded message of a second kind, the second peer switch becoming inactive with respect to sending any synchronization messages to the network element on the second link, wherein the first peer switch conducts the entire synchronization session with the network element on the first link.

In some embodiments, the method further comprises prior to the first peer switch forwarding a message to the second peer switch, both the first peer switch sending synchronization messages to the network element on the first link and the second peer switch sending synchronization messages to the network element on the second link.

In some embodiments, the received synchronization message is a Sync message and the forwarded message of the first kind is based on the received Sync message.

In some embodiments, the received synchronization message is a DelayReq message and the forwarded message of the second kind is based on the received DelayReq message.

In some embodiments, the synchronization messages comprise a Sync message, a FollowUp message, a DelayReq message, and a DelayResp message.

In some embodiments, the plurality of links defines a multi-chassis link aggregation group.

In some embodiments, the method further comprises, subsequent to the second peer switch being inactive for a predetermined period of time, the second peer switch becoming active with respect to sending synchronization messages to the network element on the second link.

In accordance with the present disclosure, a method in a peer group comprising a first peer switch and a second peer switch includes: the first and second peer switches exchanging synchronization messages with a network element over an interface that comprises at least a first link between the first peer switch and the network element and at least second link between the second peer switch and the network element, the synchronization messages including timestamped synchronization messages and non-timestamped synchronization messages; the first and second peer switches each forwarding the synchronization messages to the other in response to each peer switch receiving the synchronization messages from the network element; the first and second peer switches coordinating with each other using the forwarded synchronization messages so that only the first peer switch exchanges timestamped synchronization messages with the network element; and the first peer switch running a synchronization session with the network element, including exchanging timestamped synchronization messages with the network element.

In some embodiments, the method further comprises the second peer switch receiving a non-timestamped synchronization message from the network element associated with the synchronization session and in response forwarding the received non-timestamped synchronization message to the first peer switch. In some embodiments, the method further comprises the first peer switch using the non-timestamped synchronization message received from the second peer switch to run the synchronization session.

In some embodiments, the method further comprises the first and second peer switches coordinating with each other including: the first peer switch receiving from the network element a first timestamped synchronization message associated with the synchronization session and forwarding the first timestamped synchronization message to the second peer switch; and in response, the second peer switch becoming inactive and ceasing to exchange synchronization messages with the network element. In some embodiments, the method further comprises, subsequent to the second peer switch being inactive for a predetermined period of time, the second peer switch becoming active and resuming exchanging synchronization messages with the network element.

In some embodiments, the method further comprises the first and second peer switches forwarding the synchronization messages between each other over a peer link between the first and second peer switches.

In accordance with the present disclosure, a peer group comprises: first and second peer switches; and a peer link between the first and second peer switches for data communication with each other, the first and second peer switches configured to: exchange synchronization messages with a network element over an interface that comprises at least a first link for connecting the first peer switch to the network element and at least second link for connecting the second peer switch to the network element, the synchronization messages including timestamped synchronization messages and non-timestamped synchronization messages; forward the synchronization messages between each other in response to receiving the synchronization messages from the network element; and coordinate with each other using the forwarded synchronization messages so that only the first peer switch exchanges timestamped synchronization messages with the network element, wherein the first peer switch runs a synchronization session with the network element, including exchanging timestamped synchronization messages with the network element.

In some embodiments, the second peer switch is further configured to forward a non-timestamped synchronization message that is received from the network element and associated with the synchronization session. In some embodiments, the first peer switch is further configured to run the synchronization session using the non-timestamped synchronization message received from the second peer switch.

In some embodiments, the first and second peer switches are further configured to coordinate with each other by: the first peer switch receiving from the network element a first timestamped synchronization message associated with the synchronization session and forwarding the first timestamped synchronization message to the second peer; and in response, the second peer switch becoming inactive and ceasing to exchange synchronization messages with the network element. In some embodiments, the second peer switch is further configured to become active and resume exchanging synchronization messages with the network element subsequent to the second peer switch being inactive for a predetermined period of time.

In some embodiments, the first peer switch is further configured to exchange the timestamped synchronization messages with the network element over the first link.

In some embodiments, the first and second peer switches are further configured to forward the synchronization messages between each other over the peer link.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A method in a peer group comprising a first peer switch and a second peer switch, the method comprising:

the first and second peer switches exchanging synchronization messages with a network element over an interface that comprises at least a first link between the first peer switch and the network element and at least second link between the second peer switch and the network element, the synchronization messages including timestamped synchronization messages and non-timestamped synchronization messages;

the first and second peer switches each forwarding the synchronization messages to the other in response to each peer switch receiving the synchronization messages from the network element;

the first and second peer switches coordinating with each other using the forwarded synchronization messages so that only the first peer switch exchanges timestamped synchronization messages with the network element; and the first peer switch running a synchronization session with the network element, including exchanging timestamped synchronization messages with the network element.

2. The method of claim 1, further comprising the second peer switch receiving a non-timestamped synchronization message from the network element associated with the synchronization session and in response forwarding the received non-timestamped synchronization message to the first peer switch.

3. The method of claim 2, further comprising the first peer switch using the non-timestamped synchronization message received from the second peer switch to run the synchronization session.

4. The method of claim 1, wherein the first and second peer switches coordinating with each other includes:

the first peer switch receiving from the network element a first timestamped synchronization message associated with the synchronization session and forwarding the first timestamped synchronization message to the second peer switch; and in response to the second peer switch receiving the first timestamped synchronization message, the second peer switch becoming inactive and ceasing to exchange synchronization messages with the network element.

5. The method of claim 4, further comprising, subsequent to the second peer switch being inactive for a predetermined period of time, the second peer switch becoming active and resuming exchanging synchronization messages with the network element.

6. The method of claim 1, further comprising the first and second peer switches forwarding the synchronization messages between each other over a peer link between the first and second peer switches.

7. The method of claim 1, wherein the first and second peers constitute a multi-chassis link aggregation group (MLAG), wherein the first and second links constitute an MLAG interface connection to the network device.

8. A peer group comprising: first and second peer switches; and a peer link between the first and second peer switches for data communication with each other, the first and second peer switches configured to:

exchange synchronization messages with a network element over an interface that comprises at least a first link for connecting the first peer switch to the network element and at least second link for connecting the second peer switch to the network element, the synchronization messages including timestamped synchronization messages and non-timestamped synchronization messages;

forward the synchronization messages between each other in response to receiving the synchronization messages from the network element; and coordinate with each other using the forwarded synchronization messages so that only the first peer switch exchanges timestamped synchronization messages with the network element, wherein the first peer switch runs a synchronization session with the network element, including exchanging timestamped synchronization messages with the network element.

9. The peer group of claim 8, wherein the second peer switch is further configured to forward a non-timestamped synchronization message that is received from the network element and associated with the synchronization session.

10. The peer group of claim 9, wherein the first peer switch is further configured to run the synchronization session using the non-timestamped synchronization message received from the second peer switch.

11. The peer group of claim 8, wherein the first and second peer switches are further configured to coordinate with each other by:

the first peer switch receiving from the network element a first timestamped synchronization message associated with the synchronization session and forwarding the first timestamped synchronization message to the second peer switch; and in response to the second peer switch receiving the first timestamped synchronization message, the second peer switch becoming inactive and ceasing to exchange synchronization messages with the network element.

12. The peer group of claim 11, wherein the second peer switch is further configured to become active and resume exchanging synchronization messages with the network element subsequent to the second peer switch being inactive for a predetermined period of time.

13. The peer group of claim 8, wherein the first peer switch is further configured to exchange the timestamped synchronization messages with the network element over the first link.

14. The peer group of claim 8, wherein the first and second peer switches are further configured to forward the synchronization messages between each other over the peer link.

15. A method in a network device comprising at least two switches, the method comprising:

the at least two switches exchanging synchronization messages with a network element over an interface that comprises at least a first link for connecting the first switch to the network element and at least second link for connecting the second switch to the network element, the synchronization messages including timestamped synchronization messages and non-timestamped synchronization messages;

the at least two switches forwarding the synchronization messages between each other in response to receiving the synchronization messages from the network element;

the at least two switches coordinating with each other using the forwarded synchronization messages so that only a first one of the at least two switches (first switch) exchanges timestamped synchronization messages with the network element; and the first switch running a synchronization session with the network element, including exchanging timestamped synchronization messages with the network element.

16. The method of claim 15, wherein the synchronization messages are in accordance with the Precision Time Protocol.

17. The method of claim 15, further comprising a second one of the at least two switches (second switch) receiving a non-timestamped synchronization message from the network element associated with the synchronization session and in response forwarding the received non-timestamped synchronization message to the first switch.

18. The method of claim 15, wherein the at least two switches coordinate with each other by:

the first switch receiving from the network element a first timestamped synchronization message associated with the synchronization session and forwarding the first timestamped synchronization message to a second one of the at least two switches (second switch); and in response to the second switch receiving first timestamped synchronization message, the second switch becoming inactive and ceasing to exchange synchronization messages with the network element.

19. The method of claim 15, wherein the first switch is further configured to exchange the timestamped synchronization messages with the network element over the first link.

20. The method of claim 15, wherein the at least two switches are further configured to forward the synchronization messages between each other over the peer link.

* * * * *